United States Patent
Tolia et al.

(10) Patent No.: US 10,157,412 B2
(45) Date of Patent: Dec. 18, 2018

(54) GENERATING AND DISPLAYING RECOMMENDATION COUNTERS BASED ON RECOMMENDATION DIALOGUE CAPTURED THROUGH A SOCIAL NETWORK AND CONSTRAINED BY GEOGRAPHIC REGIONS OF THE RECOMMENDERS

(71) Applicant: Nextdoor.com, Inc., San Francisco, CA (US)

(72) Inventors: Nirav N. Tolia, San Francisco, CA (US); Aaron Webber, San Francisco, CA (US); Rishi Mukhopadhyay, San Francisco, CA (US); Sean Bromage, San Francisco, CA (US); Kevin Liu, San Francisco, CA (US); Paul Howe, Mill Valley, CA (US); Ryan Sims, San Francisco, CA (US); Daniel J. Clancy, Los Altos, CA (US); Morgan Hallmon, Oakland, CA (US); Daniel Masquelier, San Francisco, CA (US)

(73) Assignee: Nextdoor.com, Inc., San Francisco, CA (US)

( * ) Notice: Subject to any disclaimer, the term of this patent is extended or adjusted under 35 U.S.C. 154(b) by 370 days.

(21) Appl. No.: 14/930,469

(22) Filed: Nov. 2, 2015

(65) Prior Publication Data
US 2016/0350831 A1    Dec. 1, 2016

Related U.S. Application Data

(60) Provisional application No. 62/168,677, filed on May 29, 2015.

(51) Int. Cl.
*G06Q 30/00* (2012.01)
*G06Q 30/02* (2012.01)
(Continued)

(52) U.S. Cl.
CPC ..... *G06Q 30/0631* (2013.01); *G06F 3/04842* (2013.01); *G06Q 30/0201* (2013.01);
(Continued)

(58) Field of Classification Search
CPC .............. G06Q 30/0282; G06Q 50/01; G06Q 30/0631; G06Q 30/0201; H04L 67/18; H04L 51/32; G06F 3/04842
(Continued)

(56) References Cited

U.S. PATENT DOCUMENTS 8,255,248 B1 *  8/2012  Del Favero ........ G06Q 30/0278
                                                                    705/7.11
8,863,245 B1 * 10/2014  Abhyanker ............ G06Q 30/02
                                                                    705/319
(Continued)

OTHER PUBLICATIONS

European Patent Office, "Search Report" in application No. 16171795.4-1958, dated Jul. 13, 2016, 7 pages.
(Continued)

*Primary Examiner* — Daniel Samwel
(74) *Attorney, Agent, or Firm* — Hickman Palermo Becker Bingham LLP

(57) ABSTRACT

A system and method for generating a recommendation counter for a business entity based on social networking interactions is provided. In an embodiment, a social networking server provides an interface for users of social networking accounts to request recommendations for business entities and to reply to the requests with recommendations. When the social networking server computer receives a recommendation for a particular business entity, the social networking server computer determines whether the recommending social networking account has recommended the particular business entity in the past. In response to determining that the social networking account has not recommended the particular business entity in the past, the social (Continued)

networking server computer increments a recommendation counter for the particular business entity.

22 Claims, 15 Drawing Sheets

(51) Int. Cl.
　　*G06Q 30/06*　　(2012.01)
　　*G06Q 50/00*　　(2012.01)
　　*G06F 3/0484*　　(2013.01)
　　*H04L 12/58*　　(2006.01)
　　*H04L 29/08*　　(2006.01)
(52) U.S. Cl.
　　CPC ......... *G06Q 30/0282* (2013.01); *G06Q 50/01* (2013.01); *H04L 51/32* (2013.01); *H04L 67/18* (2013.01)
(58) Field of Classification Search
　　USPC ................................................ 715/700–866
　　See application file for complete search history.

(56) References Cited

U.S. PATENT DOCUMENTS

| | | | | |
|---|---|---|---|---|
| 2008/0091553 | A1* | 4/2008 | Koski | G06Q 30/02 705/26.8 |
| 2009/0281988 | A1* | 11/2009 | Yoo | G06F 17/30867 |
| 2014/0040162 | A1* | 2/2014 | McConnell | G06F 17/30312 705/347 |
| 2014/0108960 | A1* | 4/2014 | Zaragoza | G06F 17/30038 715/753 |
| 2014/0164511 | A1* | 6/2014 | Williams | H04L 67/306 709/204 |
| 2014/0316906 | A1* | 10/2014 | Cioffi | G06Q 50/01 705/14.73 |
| 2015/0088684 | A1* | 3/2015 | Nygaard | G06Q 30/0631 705/26.7 |
| 2015/0220836 | A1* | 8/2015 | Wilson | G06Q 30/0631 706/46 |

OTHER PUBLICATIONS

European Claims in application No. 16171795.4-1958, dated Jul. 2016, 5 pages.

Anonymous: "Computer Network—Wikipedia, the free encyclopedia", dated Jan. 31, 2010, http://en.wikipedia.org/w/index.php?title+computer_network, 10 pages.

* cited by examiner

GENERATING AND DISPLAYING RECOMMENDATION COUNTERS BASED ON RECOMMENDATION DIALOGUE CAPTURED THROUGH A SOCIAL NETWORK AND CONSTRAINED BY GEOGRAPHIC REGIONS OF THE RECOMMENDERS

BENEFIT CLAIM

This application claims the benefit of provisional application 62/168,677, filed May 29, 2015, the entire contents of which is hereby incorporated by reference as if fully set forth herein, under 35 U.S.C. § 119(e).

FIELD OF THE DISCLOSURE

The present invention relates to receiving and storing digital data regarding a plurality of entities and causing displaying of the stored data on a computing device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As the population in cities increase, the number of competing businesses that perform the same function increase as well. With an increasing number of business options available to the average consumer, it becomes increasingly difficult for a consumer to determine which business to utilize for a specific service. For example, a person may live in an area with six different car repair shops. The person may run into difficulty determining which car repair shop will give the best service at the fairest rates.

A modern approach to the problem of identifying the best business to utilize is the creation of reviewing websites and applications. Reviewing websites and applications allow users to rate a business after the business has been utilized. The ratings for the business are aggregated into an overall review score. A reviewer may also leave comments about the business which are viewable by other users. Individuals viewing the review page for a business may see the number of people who have reviewed the business, the average review score received by the business, and comments about the business.

One issue with the modern approach is that a business may artificially increase its ratings by creating multiple accounts with the reviewing website and giving itself a good review on each account. Additionally, businesses may pay users with current accounts to give the business high ratings. Because the users of the reviewing accounts are not held accountable by the people reading the reviews, the users of the current accounts may be more willing to give a good review to a business without utilizing the business' services.

A second issue with the modern approach is that it aggregates reviews from multiple sources to which an individual reading the reviews has no connection. A recommendation from a friend or neighbor is inherently more trustworthy for most people than a recommendation from an unknown individual. Reviews from unknown individuals lack the weight of more personal recommendations from known or traceable individuals. Additionally, recommendations from unknown individuals lack the value of neighborhood based recommendations. Often, the favorite coffee shop for people who live in a neighborhood is different than the favorite coffee shop for tourists to the neighborhood.

Another issue with the modern approach is that it lacks the conversational aspect of a recommendation, which strengthens the value of the recommendation. If a person receives a recommendation from a friend for an automobile mechanic, the person is able to ask follow up questions to ensure that the recommended automobile mechanic matches the needs of the person. If a person posts on a social network a request for a recommendation of a good automobile mechanic, the person may receive multiple responses with multiple recommendations. From there, a conversation may continue which includes benefits and detriments of each automobile mechanic based on the experiences of other users. Based on this information, the person may make an informed decision. A friend of the person who also needs an automobile mechanic may view the conversation thread and make his own informed decision based on the conversation. In contrast, reviewing websites tend to be limited to including a single review from each individual which is focused on only that business. It would be difficult for a person to get the same conversational value from a reviewing website without personally contacting the multiple reviewers.

While social network conversations are useful for creating recommendations, they fail to preserve the recommendations for future viewers. For example, in May a recommendation conversation may occur regarding car mechanics. In July, the recommendation conversation for car mechanics would be buried behind other more recent conversations. Thus, a person searching for a car mechanic would either need to undertake the arduous task of looking through all past conversations for the specific discussion, or create a new discussion which may receive less responses.

Therefore, there is a need for a system that incorporates the trustworthiness of social connections with the conversational aspect that adds value to recommendations in order to create easily accessible and trustworthy recommendations for business entities.

SUMMARY

The appended claims may serve as a summary of the disclosure.

DETAILED DESCRIPTION

Figure 1:
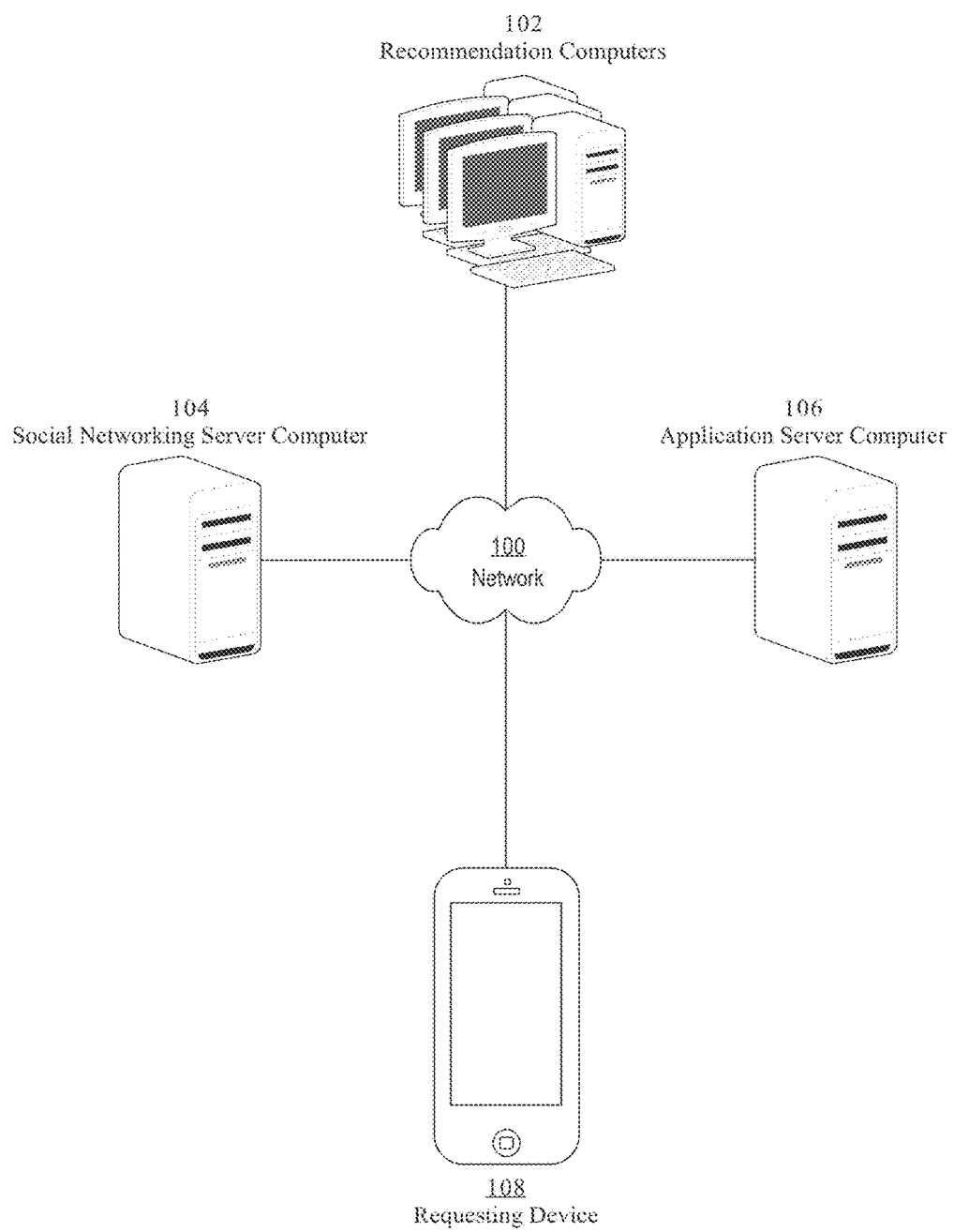
FIG. 1 illustrates a system architecture for receiving and displaying recommendations through social networking accounts.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:

General Overview
    Structural Overview
    Recommendations through Social Networking Dialogue
    Recommendation Counter
    Explicit Recommendations
    Requesting Additional Information
    Additional Embodiments
    Hardware Overview

\* \* \*

General Overview

Aspects of the disclosure generally relate to computer-implemented techniques for generating and storing recommendation counters for business entities. In an embodiment, a social networking server computer stores data for a plurality of social networking accounts including identification data for users of the social networking accounts and link data that describes connections between the social networking accounts. When a first social networking account posts a request for a recommendation for a business entity, the social networking server computer displays the post to the linked social networking accounts. When a second social networking account replies to the post, the social networking server computer presents the second social networking account with the option to tag a business in the reply and to designate the reply as a recommendation of the business. Upon receiving a selection of the option to designate the reply as a recommendation for a particular business entity, the social networking server computer determines whether the second social networking account has recommended the particular business entity before. In response to determining that the social networking account has not recommended the particular business entity before, the social networking server computer increments a recommendation counter for the particular business entity.

In an embodiment, a method comprises: obtaining, from a plurality of computing devices, at a social network server computer, recommendation data indicating a plurality of recommendations of a particular entity of a particular entity type in a particular region, wherein the recommendation data comprises: social networking cues indicating an implicit electronic recommendation for the particular entity; and explicit electronic recommendations for the particular entity; in response to receiving a first portion of the recommendation data for the particular entity, increasing an entity recommendation counter receiving, from a requesting computing device separate from the plurality of computing devices, a request for a recommended entity of the particular entity type in the particular region; displaying, to the requesting computing device, a graphical user interface depicting at least the particular entity and the recommendation counter for the particular entity.

In an alternate embodiment, a method comprises: at a social network server computer, storing account information for a plurality of social networking accounts comprising geographic data, user identification data, and prior recommendation data; causing displaying, through a graphical user interface on a first computing device associated with a first social networking account, a recommendation request option; wherein first account information for the first social networking account comprises geographic data for a particular geographic region; receiving, through the graphical user interface on the first computing device, a selection of the recommendation request option, and, in response, generating a recommendation request; determining that a second account information for a second social networking account comprises geographic data for the particular region; in response to determining that the second account information comprises geographic data for the particular region, causing displaying, through a graphical user interface on a second computing device associated with the second social networking account, the recommendation request; receiving, through the graphical user interface on the second computing device, input indicating a recommendation for a particular entity; in response to receiving input indicating the recommendation for the particular entity, causing displaying, through the graphical user interface on the first computing device, the recommendation for the particular entity; determining that the account information for the second social networking account comprises prior recommendation data that does not include a recommendation for the particular entity; in response to determining that the account information for the second social networking account does not include a recommendation for the particular entity, incrementing a particular recommendation counter for the particular entity.

Structural Overview

FIG. 1 illustrates a system architecture for receiving and displaying recommendations through social networking accounts. FIG. 1 contains recommendation computers 102, social networking server computer 104, application server computer 106, and requesting device 108 communicatively coupled over network 100. Network 100 may be implemented by any medium or mechanism that provides for the exchange of data between the various elements of FIG. 1. Examples of network 100 include, without limitation, one or more networks, such as one or more Local Area Networks (LANs), one or more Wide Area Networks (WANs), one or more Ethernets or the Internet, or one or more terrestrial, satellite or wireless links. The various elements of FIG. 1 may also have direct (wired or wireless) communications links, depending upon a particular implementation.

Recommendation computers 102 and requesting device 108 may be any of a laptop, netbook, personal computer, workstation, smartphone, PDA, tablet, or other computing device capable of accessing a social networking account that is maintained by social networking server computer 104. In an embodiment, recommendation computers 102 and requesting device 108 may access the social networking accounts through an application executing on recommendation computers 102 and requesting device 108 respectively. Recommendation computers 102 and requesting device 108 may be programmed or configured to display social networking pages generated by social networking server computer 104 and to interact with the social networking pages through application programming interfaces of either a web browser or other application executing on computers 102 and device 108. In an embodiment, computers 102 provide recommendations for a plurality of business entities and device 108 executes a search request for business entities that have been recommended by one or more computers of computers 102.

Social networking server computer 104 may be configured or programmed to interact with recommendation computers 102 and requesting device 108 over network 100 through application programming interfaces of either a web browser or other application executing on computers 102 and device 108. Social networking server computer 104 may be further configured to store account information for a plurality of social networking accounts and a plurality of entity accounts. In an embodiment, social networking server computer 104 is further configured to execute digitally programmed logic to track the actions of computers associated with stored social networking accounts, to determine if recommendations have been received from specific accounts for specific entities, to increment recommendation counters for entity accounts based on implicit and explicit recommendations, to execute search queries for entities based on one or more parameters, and to cause display of graphical user interfaces on computers 102 and device 108.

In an embodiment, application server computer 106 is configured or programmed to interact with recommendation computers 102 and requesting device 108 through an application executing on computers 102 and device 108. Application server computer 106 may be further configured or programmed to receive data over network 100 from social networking server computer 104 that instructs application server computer 106 as to how to interact with recommendation computers 102 and requesting device 108. Application server computer 106 may be further configured to receive data input from computers 102 and device 108 and to send the received data input to social networking server computer 104. In an embodiment, social networking server computer 104 and application server computer 106 are the same server computer and perform the functions of both server computers as described herein.

Recommendations Through Social Networking Dialogue

Figure 2:
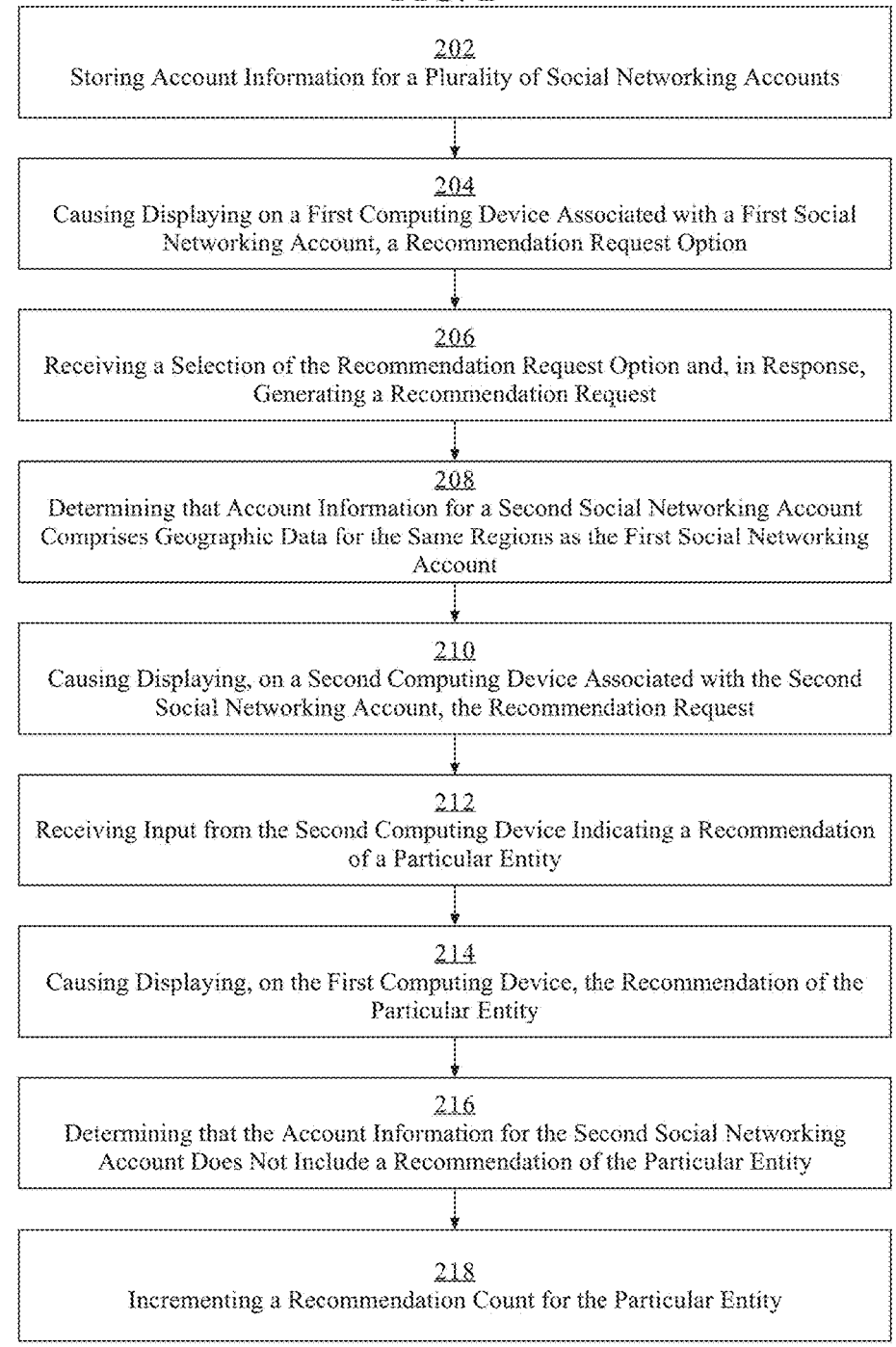
FIG. 2 illustrates a method for incrementing a recommendation counter for an entity based on recommendations made through a social media account.

FIG. 2 is a block diagram that illustrates an example method for incrementing a recommendation counter for an entity based on recommendations made through social networking accounts.

At step 202, account information for a plurality of social networking accounts is stored. For example, social networking server computer 104 may store user identifications, passwords, past transactions, and user biographical and geographical information for a plurality of social networking accounts. Past transactions may comprise previous recommendations made by the user of the social networking account, previous posts and replies made by the user of the social networking account, prior searches made by the user of the social networking account, or any other recordable action taken by the user while logged into the social networking account. User information may comprise geographic data, user preferences, personal interests, and other information provided by the user of the social networking account. For example, when a user creates an account with social networking server computer 104, social networking server computer 104 may prompt the user to input user information, such as the user's name and home address. The input information may be stored with the social networking account of the user.

In an embodiment, input information is verified by social networking server computer 104. For example, social networking server computer 104 may verify the address of an individual using the last four digits of a social security number. In this manner, social networking server computer 104 protects the integrity of the social networking accounts by limiting the accounts to verifiable individuals.

In an embodiment, the social networking accounts are linked based on geographical data. Geographical data may indicate, for a particular social networking account, a neighborhood associated with the particular social networking account. The particular social networking account may be linked to other accounts in the same and surrounding neighborhoods. For example, accounts in the city of Cherry Hill may be linked to other social networking accounts in Cherry Hill and to social networking accounts in surrounding cities, such as Apple Mountain. In other embodiments, social networking accounts may be linked based on requests and acceptances made by users of the social networking accounts. While the present disclosure refers to geographic regions as the basis for the recommendations, in other embodiments the basis for recommendations may include, through a friendship based social network, recommendations created by friends or lesser weighted recommendations created by friends of friends. While the friendship based embodiment does not contain the value of community based recommendations, it still contains the value of verifiability of accounts, trustworthiness of recommendations, and the conversational aspect of the recommendations.

Social networking accounts may display posts created by other social networking accounts through an activity feed. A post may comprise a title, editable text input, image input, tags, privacy input, an indication of when the post was made, identification of the creator, or any combination of the elements described herein. The privacy input may allow the post creator to restrict the number of other accounts which may view the post. Identification of the creator may comprise the creator's name and/or the location associated with the creator's account. Additionally, each post may give a post reviewer the option to provide feedback in the form of a reply or appreciative gesture.

Figure 3:
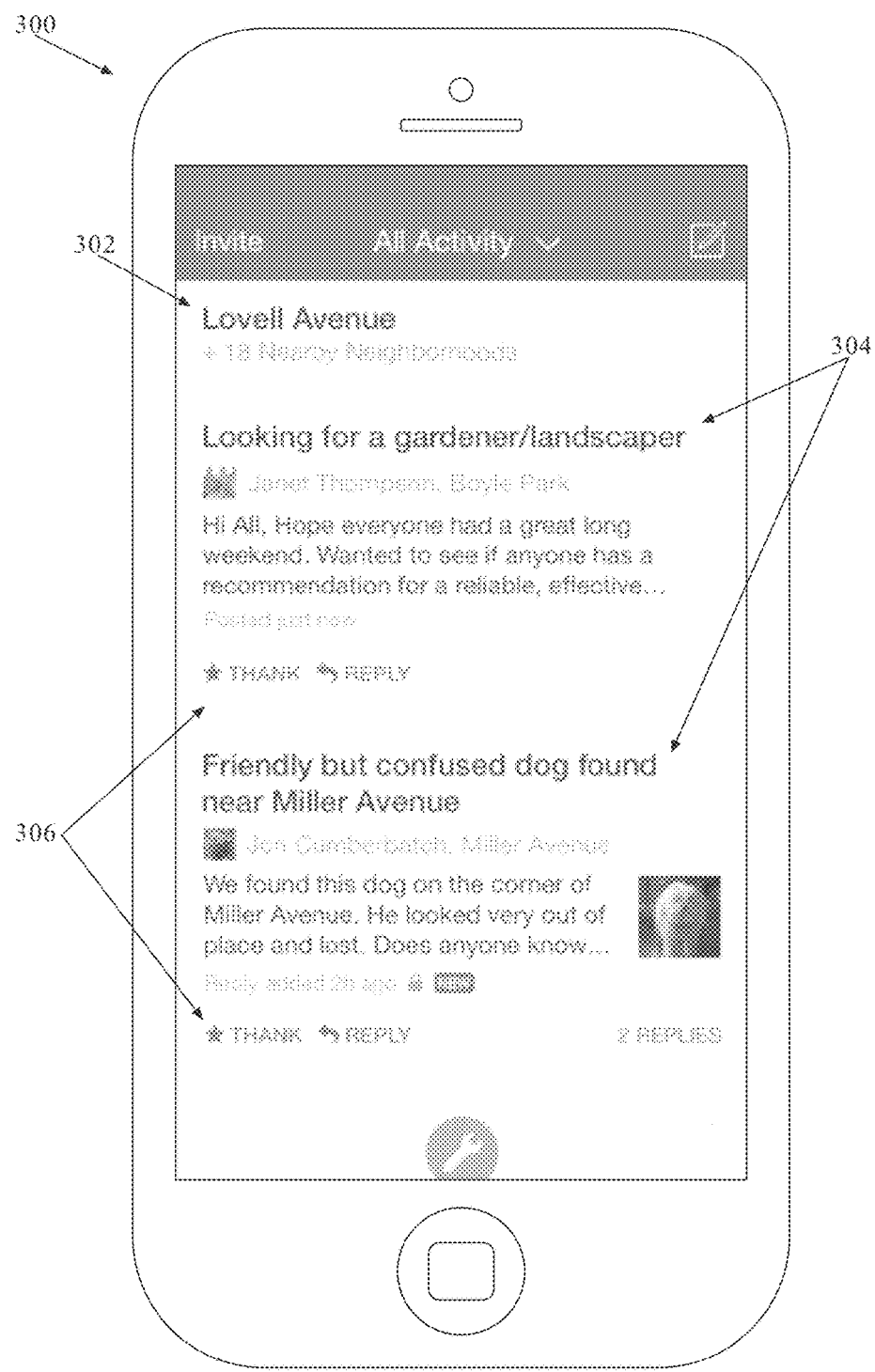
FIG. 3 is a computing device displaying a graphical user interface depicting a social network activity feed.

FIG. 3 is a computing device displaying a graphical user interface depicting a social network activity feed. Computing device 300 may be any computing device capable of interacting over a network with social networking server computer 104 or application server computer 106. While computing device 300 is depicted as a smart phone, computing device 300 may also be a personal computer, tablet computing device, PDA, laptop, or any other computing device capable of transmitting and receiving information and performing the functions described herein. For purposes of illustrating a clear example, some embodiments herein are described with respect to use with mobile computing devices such as APPLE IPHONE devices, ANDROID devices, and other smartphones, but the broad functions described herein may be used with many other computing devices. For example, embodiments may be used with computers that use HTTP, HTML and web browsers rather than device-specific apps.

In an embodiment, computing device 300 has installed and executes a social networking application ("app") that is configured to perform certain functions as further described herein for requesting recommendations, creating recommendations, and searching for recommended entities. Various functions described herein may be implemented via calls of the app using an application programming interface (API) implemented at social networking server computer 104 or application server computer 106.

Device 300 includes a graphical user interface displaying an activity feed. The activity feed includes neighborhood identification 302. Neighborhood identification 302 may comprise an identification of the neighborhood associated with the social networking account as well as an identification of surrounding neighborhoods. For example, in FIG. 3, the identified neighborhood is "Lovell Avenue" which contains 18 nearby neighborhoods. The activity feed also includes posts 304. In an embodiment, posts 304 are viewable to social networking accounts in the same or nearby neighborhoods of the original poster. For example, in FIG. 3, Jon Cumberbatch posted about a friendly but confused dog that was found near Miller Avenue. Cumberbatch's post may be viewable to people in the same neighborhood as Cumberbatch, i.e. Miller Avenue, and to surrounding neighborhoods, such as Lovell Avenue. Selectable response options 306 may allow a social networking account user to show appreciation for a post or to respond to the post.

In an embodiment, a post may be available to social networking accounts in surrounding areas, but with some of the information hidden. For example, a post originating from an account in Cherry Hill may be available to a social networking account associated with the city of Apple Mountain, but the identification of the social networking account of the original post may appear as an anonymous person in the city of Cherry Hill whereas the identification of the account to others in Cherry Hill may include the name associated with the account. In some embodiments, the privacy option may provide an interface for determining which accounts may view a post and how much information is available to the accounts. For example, the interface may contain options to limit the post to a specific neighborhood or to specific surrounding neighborhoods. Additionally, the interface may contain options to hide various pieces of information, such as the poster's name, based on the neighborhood of the post reviewer. In further embodiments, social networking accounts in a particular neighborhood may receive notifications when a post is made originating from the particular neighborhood while social networking accounts in other neighborhoods may be able to view the post, but do not receive notifications when the post is created.

Referring to FIG. 2, at step 204 a recommendation request option is displayed on a first computing device associated with a first social networking account. For example, social networking server computer 104 may cause an activity feed to be displayed through a graphical user interface executing on the first computing device which contains a selectable option to create a post which is viewable to accounts that are linked to the first social networking account. In an embodiment, the interface includes a second selectable option for creating a recommendation request. In other embodiments, an interface for creating the post includes controls for identifying the post as a recommendation request.

At step 206, a recommendation request is generated in response to receiving a selection of the recommendation request option. For example, social networking server computer 104 may receive a selection of the recommendation request option from device 300. In an embodiment, the recommendation request selection occurs after input is received by device 300 that indicates the type of business requested and includes the message to be viewed by other computing devices. For example, the interface may display an editable text box for the title of the post and the message to be displayed in the post. Upon completion of the two editable text boxes, a user may select the option to post the recommendation request. In response to receiving the selection of the recommendation request option, social networking server computer 104 may store the recommendation request.

Figure 4:
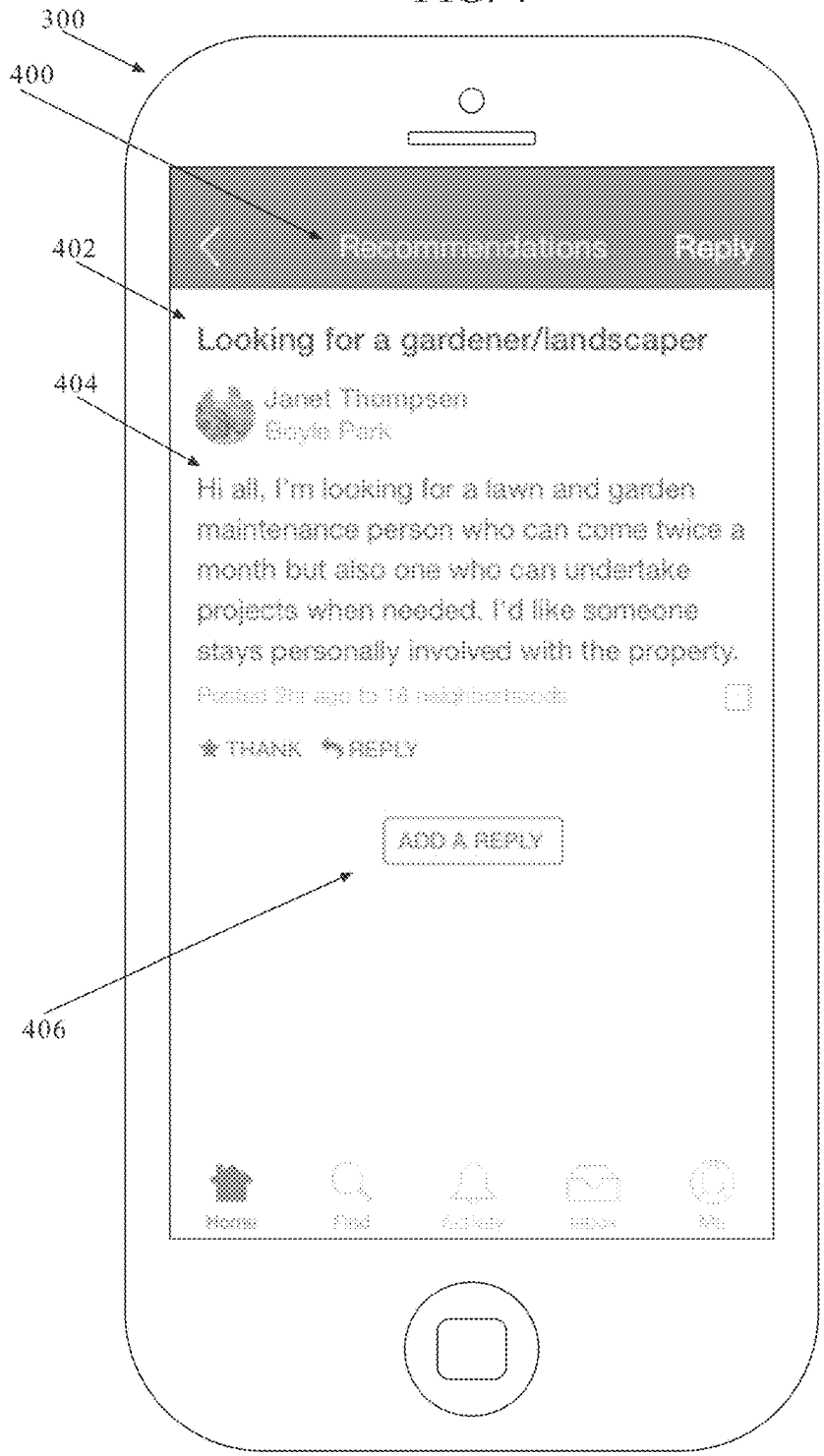
FIG. 4 is a computing device displaying a graphical user interface depicting a recommendation request.

FIG. 4 is a computing device displaying a graphical user interface depicting a recommendation request. Device 300 includes a graphical user interface displaying a recommendation request. Recommendation banner 400 identifies the post as a request for a recommendation. In some embodiments, a recommendation filter may allow device 300 to only display posts that have been identified as recommendation requests. Recommendation title 402 identifies the type of recommendation requested. For example, recommendation title 402 in FIG. 4 identifies the recommendation request as a request for a gardener/landscaper. In an embodiment, the graphical user interface provides a list of entity types for the poster to use in the post. For example, an entity type list may include Restaurants, Gardeners, House Cleaners, Babysitters, etc. Recommendation request text 404 describes the entity request in further detail. For example, in FIG. 4, recommendation request text 404 describes what Janet Thompsen is looking for in a gardener/landscaper. By providing an interface that accepts text input for detailing the recommendation request, social networking server computer 104 preserves the conversation aspect of recommendations that is unavailable in modern recommendation applications. Reply option 406 is a selectable button which allows a user to post a reply to a recommendation request, thereby further preserving the conversation aspect of the recommendations.

Referring to FIG. 2, at step 208, a second social networking account is identified which comprises geographic data for the same region as the first social networking account. For example, social networking server computer 104 may identify accounts that may view the original recommendation request by determining that the accounts are in the same or surrounding regions. While the embodiment in FIG. 2 is described as being geographically based, further embodiments may include identifying accounts that are linked to the first social networking account. For example, a first social networking account and a second social networking account may become linked based on link requests and acceptances between the two accounts. In the embodiment described in FIG. 2, a social networking account may be linked to other social networking accounts automatically by virtue of the geographic region identified for the user account. In linking accounts by geographic region, social networking server computer 104 preserves the integrity of the recommendations as the recommendations and replies originate from people that live in the same community.

At step 210, the recommendation request is displayed on a second computing device associated with the second social networking account. For example, social networking server computer 104 may cause the recommendation request to be displayed through an activity feed on the second computing device, such as the activity feed in FIG. 3, or as a single recommendation request, such as the request display in FIG. 4. In an embodiment, application server computer 106 causes display of the recommendation request through an application executing on the second computing device.

At step 212, the input is received from the second computing device indicating a recommendation of a particular entity. For example, social networking server computer 104 may receive a selection of reply option 406 from the graphical user interface displayed in FIG. 4. Upon receiving a selection of reply option 406, social networking server computer 104 may cause a reply interface to be displayed on the second computing device. The user of the second computing device may enter into the interface the reply to the original post.

Figure 5:
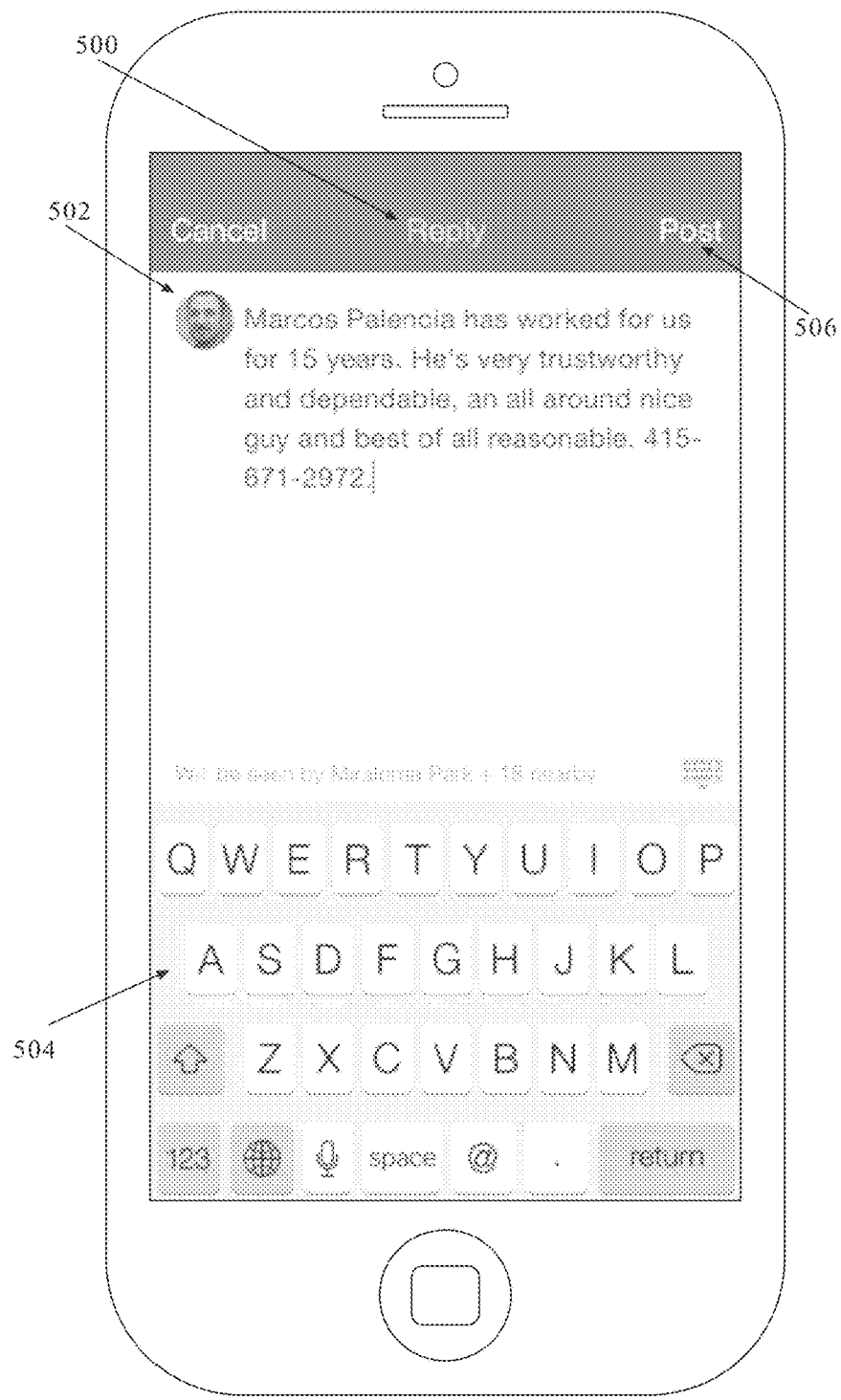
FIG. 5 is a computing device displaying a graphical user interface depicting a recommendation reply.

FIG. 5 is a computing device displaying a graphical user interface depicting a recommendation reply. The display of FIG. 5 comprises reply banner 500, reply text 502, and keyboard 504, and post option 506. Reply banner 500 identifies the post as a reply to a previous post. For example, the display of FIG. 5 depicts a reply to the initial post of FIG. 4. Reply text 502 may be entered using keyboard 504. In other embodiments, an external keyboard may be used to type the text for the reply. In the reply text, the user of the second computing device may respond to the recommendation request sent by the first computing device. Reply text 502 may range from text merely identifying a business to text that describes the business and what was liked about the business. For example, reply text 502 depicted in FIG. 5 names the business entity and includes a description of the reason the business is recommended. Upon receiving a selection of post option 506, social networking server computer 104 may store reply text 502 as a reply from the social networking account associated with the second computing device.

In an embodiment, social networking server computer 104 may request an identification of the business entity from the second computing device. For example, controls (not shown) in the graphical user interface displaying the recommendation reply may include an option to tag an entity. In an embodiment, an entity comprises any business, laborer, or partnership. Tagging an entity may include selecting from one of a plurality of entity profiles stored on social networking server computer 104. The tagged entity may be displayed within the recommendation reply. After an entity has been tagged in a post, a selection of the tagged entity may cause the selecting computing device to navigate to the display for the tagged entity. In some embodiments, social networking server computer 104 may display a graphical user interface for tagging an entity after receiving a selection of post option 506.

Figure 6:
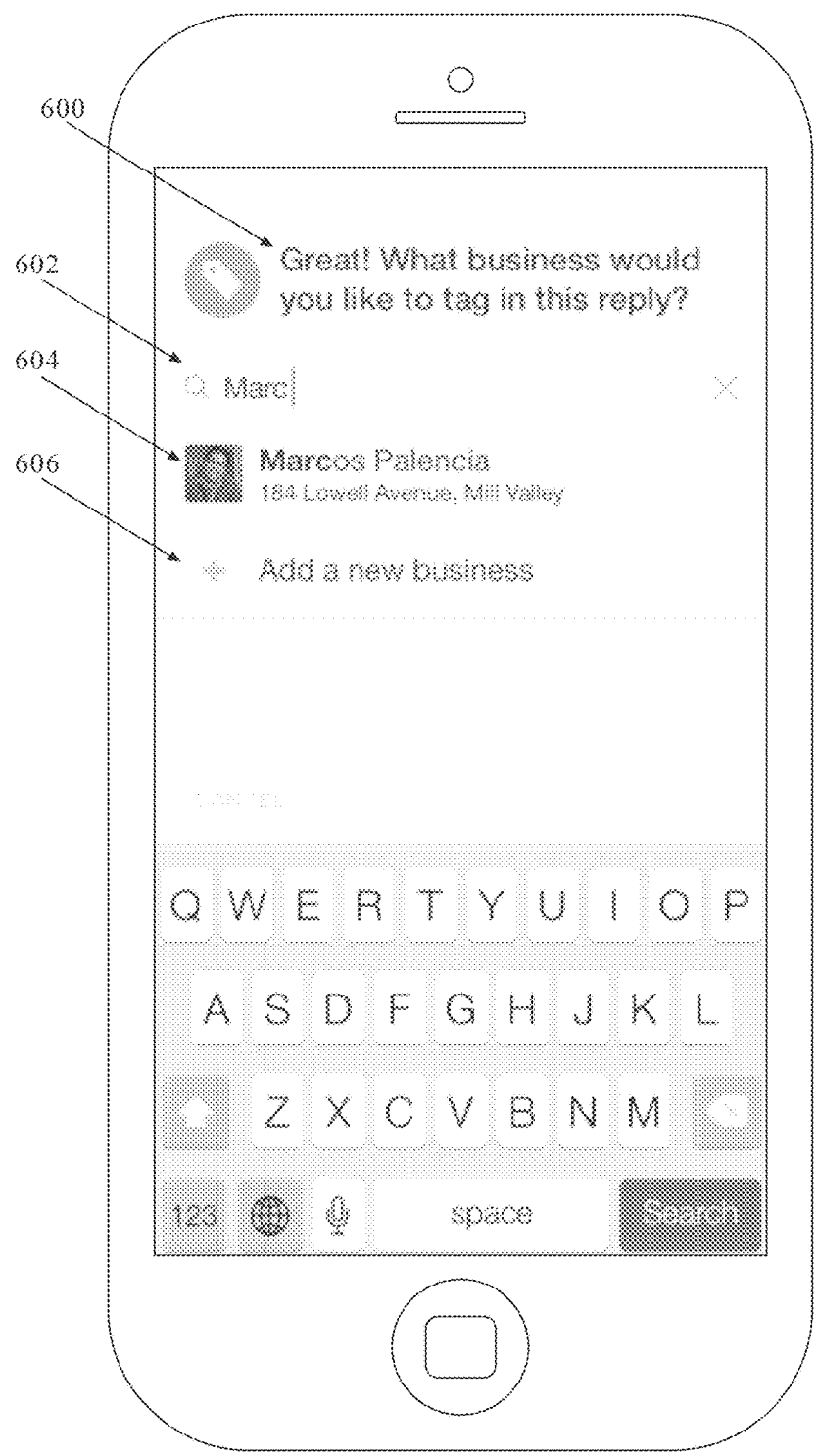
FIG. 6 is a computing device displaying a graphical user interface depicting an entity tag request.

FIG. 6 is a computing device displaying a graphical user interface depicting an entity tag request. The display of FIG. 6 comprises entity tag request 600, editable tag search box 602, displayed entities 604, and add entity option 606. Entity tag request 600 may display a request on the second computing device for an indication as to whether the post contained an entity to be tagged. Entity tag request 600 may be available because some replies to recommendation requests may not feature entities. For example, a reply to the gardener/landscaper request of FIG. 4 may state that the replier has not had any luck in locating his own gardener/landscaper. In this example, the replier would have no entity to tag in the reply.

If a replier chooses to tag an entity in the reply, the replier may use editable tag search box 602 to identify the business to be tagged. For example, the replier may type in all or part of the name of an entity and select the search option to search for entity profiles stored on social networking server computer 104. In an embodiment, social networking server computer 104 automatically searches for entities before receiving a selection of the search option. For example, in FIG. 6, editable tag search box 602 has four letters currently typed. Social networking server computer 104 may, instead of waiting for a selection of the search option, search for entities that match the typed four letters. Any entities found that match the four typed letters may be displayed below editable tag search box 602 as one of displayed entities 604.

If the particular entity that is being recommended does not appear in displayed entities 604, a user may select add entity option 606 to create a new entity. Upon receiving a selection of add entity option 606, social networking server computer 104 may display on the second computing device a request for information to create the entity profile. The request for entity information may include editable text boxes which receive input indicating an entity type, an entity name, contact information for the entity, and any other identifying information for the entity. By allowing the recommenders to create the entity profiles, social networking server computer 104 broadens the scope of searchable entities beyond those with the technological capacity or inclination to create and maintain their own entity profiles. For example, multiple people may recommend an excellent gardener who does not maintain an account with social networking server computer 104. Even though the gardener does not maintain his own entity account, an entity account may be maintained for him by the users who recommend him. In an embodiment, social networking server computer 104 may match data entered into the editable text boxes in response to the request for information to existing entity profiles, thereby minimizing the number of entity profiles for a single entity. For example, FIG. 6 depicts the entity Marcos Palencia as one of displayed entities 604. If Marcos Palencia was part of a larger gardening business named "P&L Gardening," the search for Marcos Palencia may yield no results. In a response to the request for addition about the recommended entity, a user may input the telephone number for Marcos Palencia. Social networking server computer 104 may match the input phone number with the phone number for "P&L Gardening" and cause a prompt to be displayed on the second computing device requesting an indication as to whether the actual recommended entity is Marcos Palencia or P&L Gardening.

In response to receiving the selection of the tagged entity, social networking server computer 104 may request an indication as to whether the post is a recommendation for the tagged entity. While many tagged entities may be recommended through the reply, in some situations a reply may comprise warnings about an entity. For example, instead of the text displayed in FIG. 5, a reply may state "Just don't hire Marcos Palencia. We hired him a few years back and he stole the carrots from our carrot field." In this case, even though an entity was tagged in the reply, the replier does not feel confident recommending the entity to a friend. In response to receiving an indication that the reply contained a recommendation for the tagged entity, social networking server computer 104 may store the reply as a recommendation for the tagged entity from the social networking account associated with the second computing device.

At step 214, the recommendation of the particular entity may be displayed on the first computing device. For example, social networking server computer 104 may cause the reply to be displayed below the recommendation request. In an embodiment, social networking server computer 104 sends a notification to the first computing device that indicates that a reply has been received on the recommendation request. Upon receiving a selection of the notification, social networking server computer 104 may cause the recommendation to be displayed on the first computing device. In embodiments, other computing devices associated with other social networking accounts of the same or surrounding regions may display both the recommendation request and the reply to the recommendation request. If social networking server computer 104 receives a selection of the reply option from any of the other computing devices, social networking server computer 104 may execute steps 212 and 214 with respect to the other computing devices. The latter replies to the recommendation may be displayed below the earlier replies.

At step 216, account information of the second social networking account is used to determine whether the second social networking account has been used to recommend the particular entity. For example, social networking server computer 104 may refer to the stored recommendations associated with the second social networking account. Stored recommendations may include recommendations created as a reply to a recommendation request, or explicit recommendations created by the second social networking account as discussed below. If social networking server computer 104 determines that the second social networking account has already recommended the particular entity, social networking server computer 104 may store the recommendation for the particular entity without incrementing a recommendation counter for the particular entity. Thus, the entity would not appear to have extra recommendations because the same person recommended it twice, but the two recommendation comments would be associated with the entity account.

Recommendation Counter

In an embodiment, each entity has a recommendation counter. A recommendation counter indicates the number of social networking accounts that have recommended a particular entity. For example, if an entity has a recommendation counter of twenty five, the recommendation counter would indicate that twenty five people have recommended the entity through a social networking account. In an embodiment, the recommendation counter of a particular entity is displayed to users of a social networking account who are viewing the entity account of the particular entity. Additionally, the entity counter may be used to filter search results for entities of a specific type, such that entities with a higher recommendation counter are displayed first while entities with a lower recommendation counter are displayed afterwards.

Figure 7:
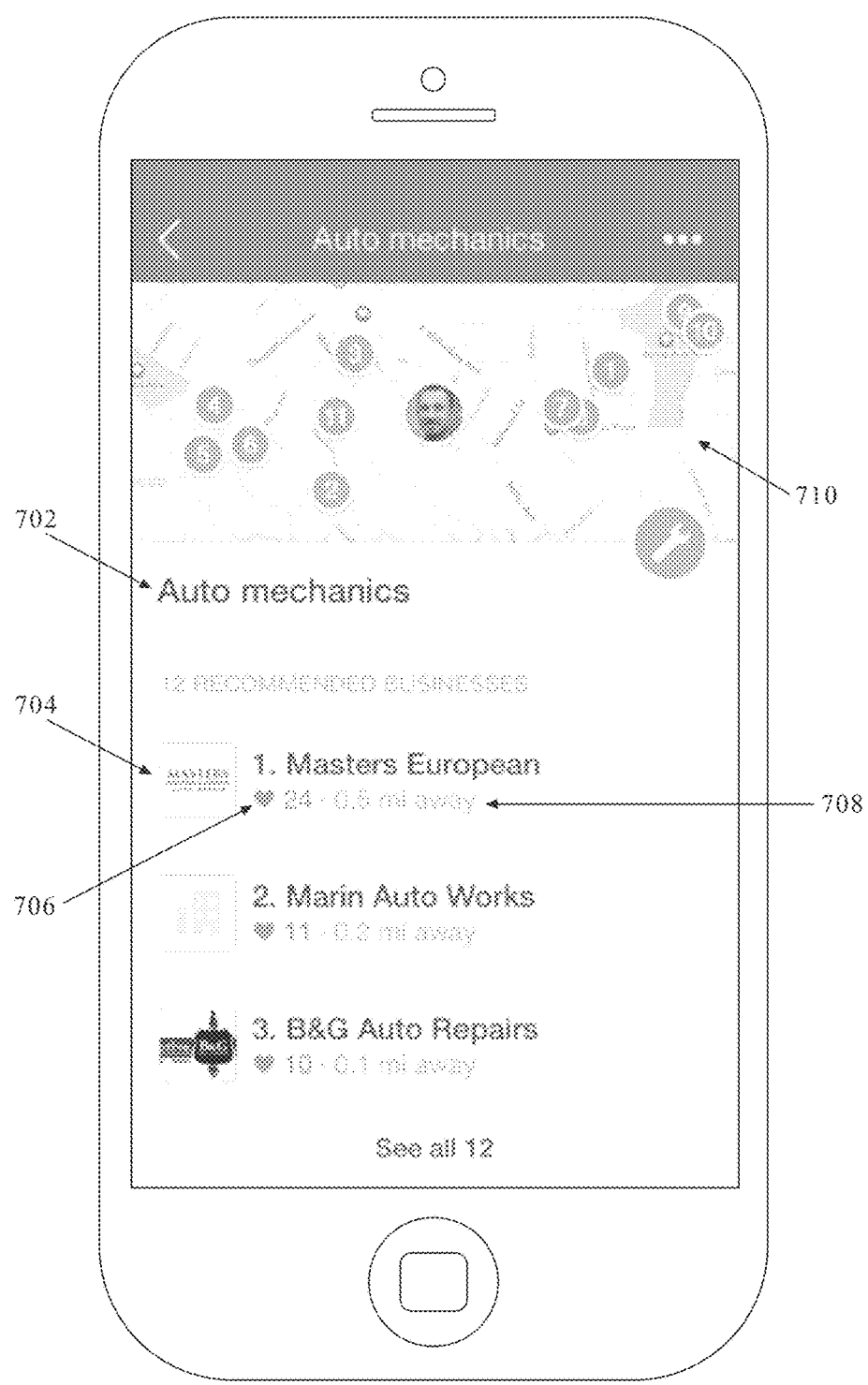
FIG. 7 is a computing device displaying a graphical user interface depicting search results for entities of a particular entity type.

FIG. 7 is a computing device displaying a graphical user interface depicting search results for entities of a particular entity type. The display of FIG. 7 includes searched entity type 702, entity search results 704, entity recommendation counters 706, entity distances 708, and entity map 710. Searched entity type 702 describes a category used to filter the displayed entities. For example, in FIG. 7, the searched entity type is "Auto mechanics." In an embodiment, searched entity type 702 is a delineated category under which specific entities may fall. For example, Masters European may be specifically categorized as an auto mechanic. In other embodiments, searched entity type 702 is used to identify entities based on keywords associated with those entities. For example, Masters European may be associated with the keywords "mechanic," "car," "repair," "auto," and "used car dealer." Thus, a search for any of those keywords may cause Masters European to be displayed as one of entity search results 704. Entity search results 704 may include a listing of entities that meet the search criteria. In an embodiment, only entities that have received a minimum of one recommendation are listed as entity search results 704. Entity search results 704 may be ordered by recommendation counters 706 or by entity distances 708. Recommendation counters 706 describe the number of social networking accounts that have indicated a recommendation of a particular entity. Entity distances 708 describe the distances between the entities and the location of either the computing device executing the search, a location specified as a search criterion for the search, or the location listed in the social networking account associated with the computing device executing the search. Entity map 710 comprises a map of an area encompassing the locations of entity search results 704 and markers that describe the locations of each of entity search results 704.

In an embodiment, entity search results 704 are determined based on recommendations from social networking accounts associated with a particular geographic region. For example, if a social networking account is associated with the geographic region of Apple Mountain, then entity search results 704 may be based on recommendations from other social networking accounts associated with the geographic region of Apple Mountain. In some embodiments, entity search results 704 may include entity recommendations from social networking accounts associated with surrounding regions as well. While entity search results 704 may be determined based on recommendations from social networking accounts associated with a particular geographic region, the actual entity may be associated with a different geographic region. For example, recommended coffee shops are likely to exist in the same geographic region as the recommenders. In contrast, a recommended house painter may exist outside the geographical region of the recommenders because house painters tend to be rarer. While the recommendations originate from social networking accounts associated with the geographic region, the recommended entity exists outside the geographic region.

Referring to FIG. 2, at step 218, if the second social networking account has not recommended the particular entity, a recommendation count for the particular entity is incremented. A recommendation counter may also be increased if the second social networking account had previously recommended the particular entity but removed the recommendation. For example, a user may remove a recommendation for Marcos Palencia due to the carrot theft in the example above. If the user discovers that the carrots were actually picked and placed neatly for the user's consumption, the user may recommend Marcos Palencia again. In this example, the recommendation counter for Marcos Palencia would increase at the first recommendation, decrease when the first recommendation was removed, and increase again when the second recommendation is made. Thus, in some embodiments, the recommendation data for a particular social networking account may comprise a switch relating to each entity account. The social networking account either maintains a current recommendation for the entity account or does not maintain a current recommendation for the entity account.

In an embodiment, separate recommendation counters are kept for the particular entity for each geographic region. For example, a first recommendation counter for P&L Gardening may be stored for Cherry Hill and a second recommendation counter for P&L Gardening may be stored for Apple Mountain. Thus, if a person from Cherry Hill recommends P&L Gardening, the recommendation counter for P&L Gardening stored for Cherry Hill may be incremented. By creating separate recommendation counters for entities based on geographic region of the recommenders, social networking server computer 104 maintains a level of geographic trust with the recommendation counter. In an embodiment, the recommendation counters overlap recommenders. For example, a recommendation counter for an entity may be based on a specific neighborhood and neighborhoods within a five mile radius of the specific neighborhood. Thus, the recommendation counter for Cherry Hill may include recommendations from Apple Mountain and vice versa. Though there is overlap in recommenders, the recommendation counters may still differ as there may be neighborhoods within a five mile radius of Apple Mountain that are not within a five mile radius of Cherry Hill.

In some embodiments, all recommendations for a particular entity are indexed by the geographic regions of the recommenders, thereby allowing social networking server computer 104 to filter recommendation counters for each entity based on the viewer of the recommendation counter. Thus, if a user from Cherry Hill views a particular entity, the entity counter for display to the user may be split into recommendations from the user's neighborhood and surrounding neighborhoods and recommendations from outside the user's geographic region. In an embodiment, the recommendation counter may further be split into recommendations from the user's neighborhood, recommendations from surrounding neighborhoods, and recommendations from outside the user's geographic region.

Explicit Recommendations

In an embodiment, the recommendation counter for an entity is created from a combination of implicit recommendations through social networking dialogue, as discussed above, and explicit recommendations made through a graphical user interface displaying a profile for the entity. The incorporation of explicit recommendations into the recommendation counter combines the preservation of dialogue of the social networking recommendations with the functionality of recommendation pages, which provide the capability to make on the spot recommendations. Thus, if a user of a social networking account wishes to recommend a particular entity, the user would be able to recommend the entity through the recommendation page without waiting for a second user to make a recommendation request.

Figure 8:
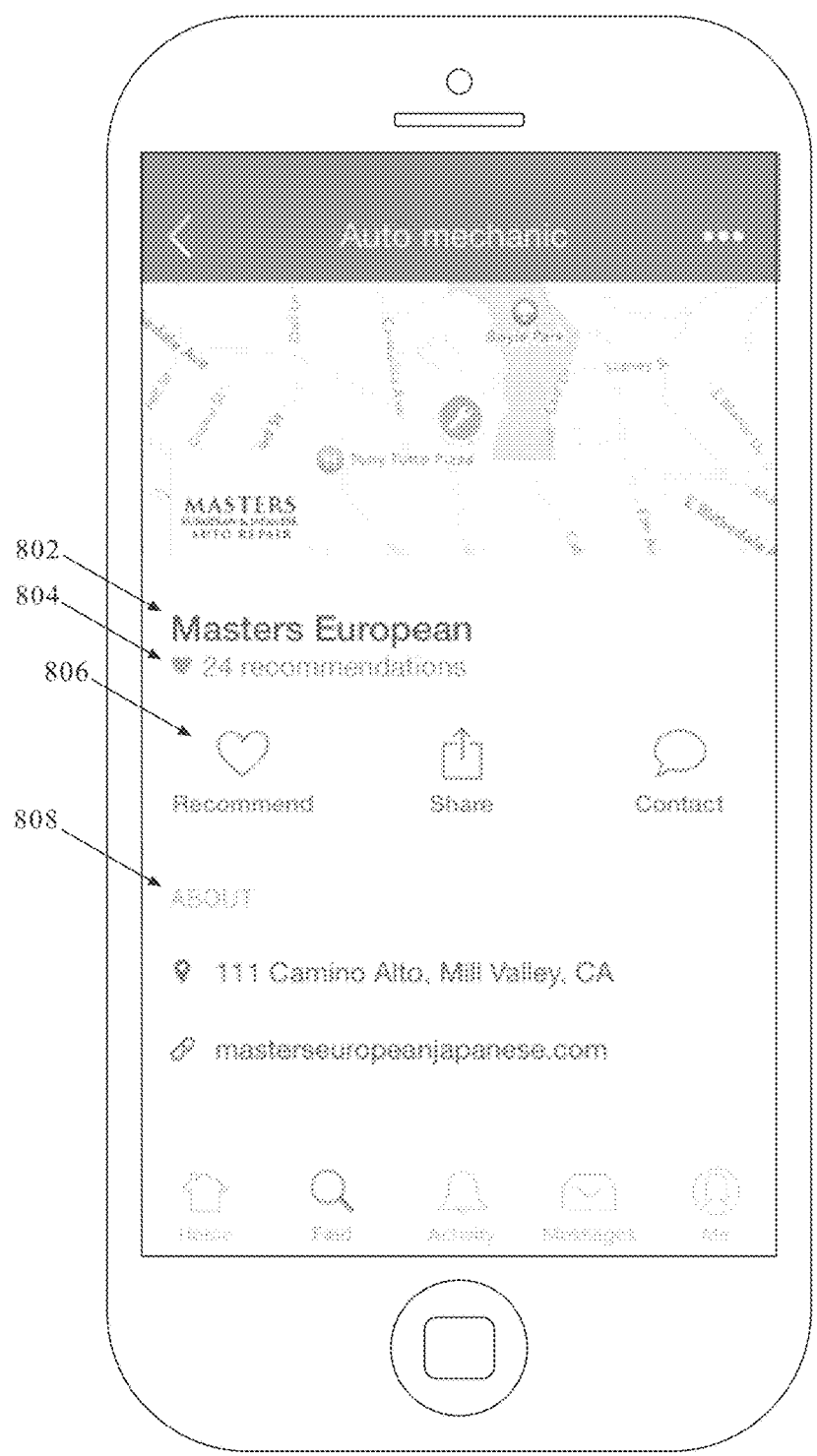
FIG. 8 is a computing device displaying a graphical user interface depicting a particular entity.

FIG. 8 is a computing device displaying a graphical user interface depicting a particular entity. The display of FIG. 8 includes particular entity name 802, particular entity recommendation counter 804, selectable recommendation option 806, and entity description 808. The particular entity displayed in FIG. 8 may be located through a search similar to the one displayed in FIG. 7. A selection of the particular entity in FIG. 7 may cause device 300 to display the particular entity display of FIG. 8. Particular entity recommendation counter 804 depicts the recommendation counter for the particular entity. In an embodiment, particular entity recommendation counter 804 depicts a recommendation counter that is generated based on the location associated with the social networking account which is used to view the particular entity. For example, if a social networking account is associated with the city of Cherry Hill, recommendation counter 804 may be generated for the region of Cherry Hill. Selectable recommendation option 806 provides a mechanism for creating an explicit recommendation of a particular entity. Entity description 808 contains information describing the entity, such as location and contact information, entered either by the particular entity or by recommending users.

In an embodiment, in response to receiving a selection of selectable recommendation option 806, social networking server computer 104 identifies the social networking account that was used to select selectable recommendation option 806 and stores data indicating a recommendation of the particular entity by the social networking account. Additionally, the display of FIG. 8 may change on the displaying computing device after the selection of selectable recommendation option 806 to indicate that the recommendation has been made. For example, the heart image in FIG. 8 may be filled in when selectable recommendation option 806 has been selected. Additionally and/or alternatively, the word "Recommend" may change to "Recommended" to indicate that selectable recommendation option 806 has been selected or to "Un-Recommend" to indicate that selection of selectable recommendation option 806 would remove the recommendation.

In an embodiment, social networking server computer 104 first determines whether the social networking account accessing the particular entity display has previously recommended the particular entity. If the social networking account has been used to recommend the particular entity page, selectable recommendation option 806 may be displayed as selected. For example, if Krieger responds to a recommendation request with a recommendation for Masters European, the data indicating that Krieger has recommended Masters European may be stored and the recommendation counter for Masters European may be incremented. When Krieger uses his social networking account to display Masters European, the recommendation option may be initially selected. In an embodiment, selectable recommendation option 806 may be selected to remove a recommendation. Thus, in the example above, if Krieger had accidentally recommended Masters European in a reply to a recommendation request, Krieger may remove the recommendation by navigating to the display for Masters European and selecting selectable recommendation option 806. Additionally, if Krieger initially recommended Masters European through the display of FIG. 8, when Krieger later responds to a recommendation request with a recommendation for Masters European, social networking server computer 104 would determine that Krieger has already recommended Masters European. In response, social networking server computer 104 may store the recommendation text, but not increment the recommendation counter for Masters European.

Figure 9:
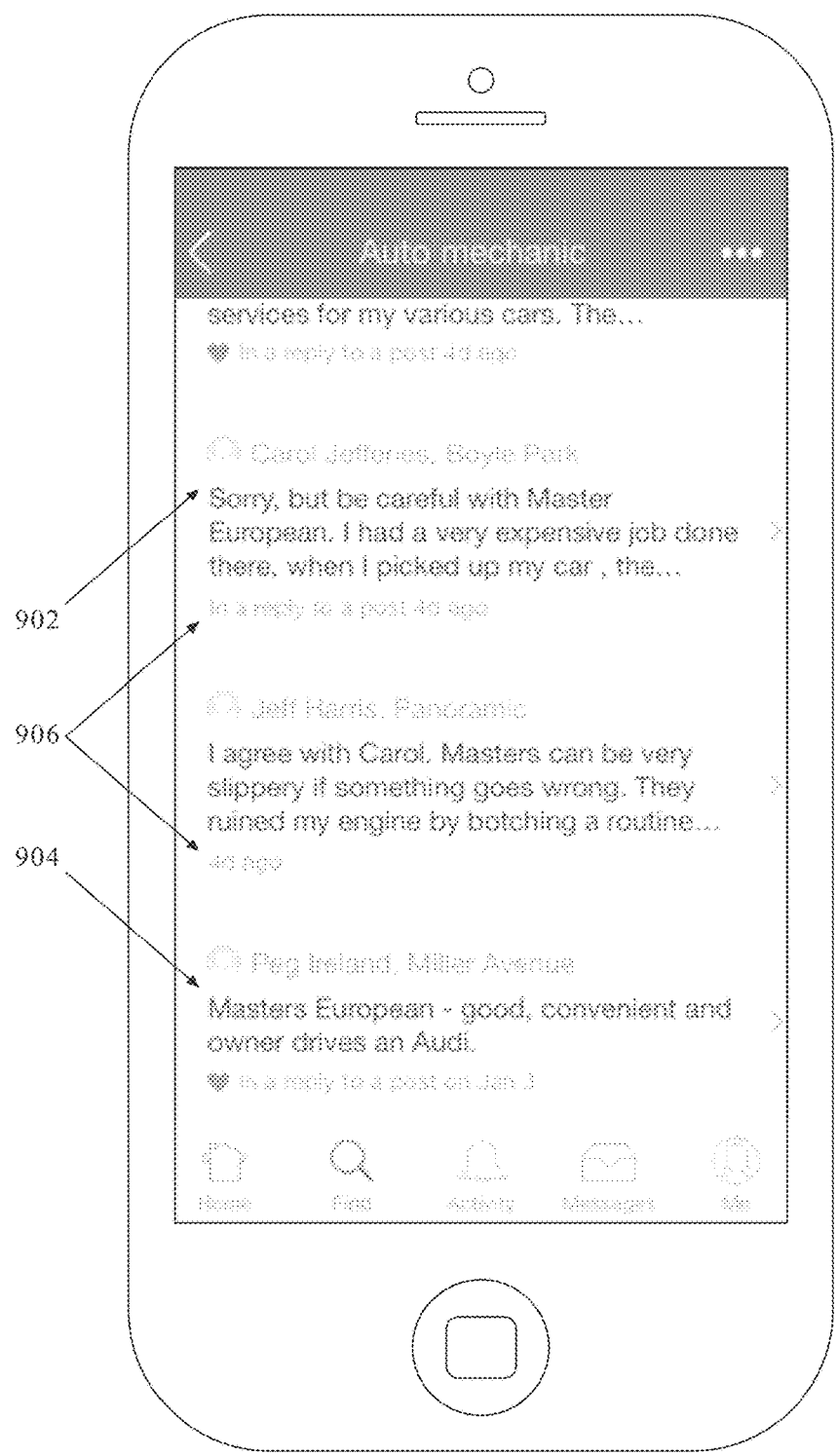
FIG. 9 is a computing device displaying a graphical user interface depicting comments for the particular entity.

In an embodiment, the display for a particular entity includes comments about and recommendations for the particular entity. FIG. 9 is a computing device displaying a graphical user interface depicting comments and recommendations for the particular entity. The display of FIG. 9 includes comments 902, recommendations 904, and origination data 906. Comments 902 include comments that were either created through the display of the particular entity, such as depicted in FIG. 8, and comments about the particular entity made through social networking dialogue, such as in FIG. 4, FIG. 5, and FIG. 6. Recommendations 904 include selections of the selectable recommendation option of FIG. 8 and recommendations made through social networking dialogue, such as in FIG. 4, FIG. 5, and FIG. 6. Recommendations 904 may include comments describing the reasons for recommending the particular entity. In an embodiment, recommendations 904 may indicate just that a user recommended a particular entity if no comment was attached to the recommendation.

In some embodiments, multiple recommendations from a single social networking account are treated as one recommendation. If the multiple recommendations contain more than one comment, social networking server computer 104 may select the most recently made comment to use for the recommendation on the entity display. In an embodiment, a user of a social networking account may choose to use a specific comment for the comment that appears on the entity page. For example, social networking server computer 104 may display the option to leave a comment on the entity's page. Social networking server computer 104 may use the comment left on the entity's page regardless of whether a more recent comment was made by the social networking account in a recommendation. In some embodiments, other comments made by the same social networking account are accessible but not initially displayed. For example, a selectable link under a recommendation from a particular social networking account may display the option to view more comments from the particular social networking account. Upon receiving a selection of the selectable link, social networking server computer 104 may cause display of other comments from the particular social networking account.

In an embodiment, origination data 906 describes the origination of the comment or recommendation. For example, in FIG. 9, the first comment includes origination data 906 which indicates that the comment originates in a reply to a post four days ago. In contrast, the second comment includes origination data 906 which indicates only that the comment was created four days ago without being related to a reply to a post. A benefit of the system depicted in FIG. 9 is that it incorporates both the initial dialogue and comments made on the display for the particular entity. Thus, in FIG. 9, although Jeff Harris did not take part in the initial discussion in which Carol Jefferies post originated, Jeff Harris is still able to respond to the comment. In an embodiment, comments 902 and recommendations 904 are selectable through the display. Selection of one of comments 902 or recommendations 904 may cause device 300 to display the original recommendation request and replies that created the selected comment or recommendation.

Figure 10:
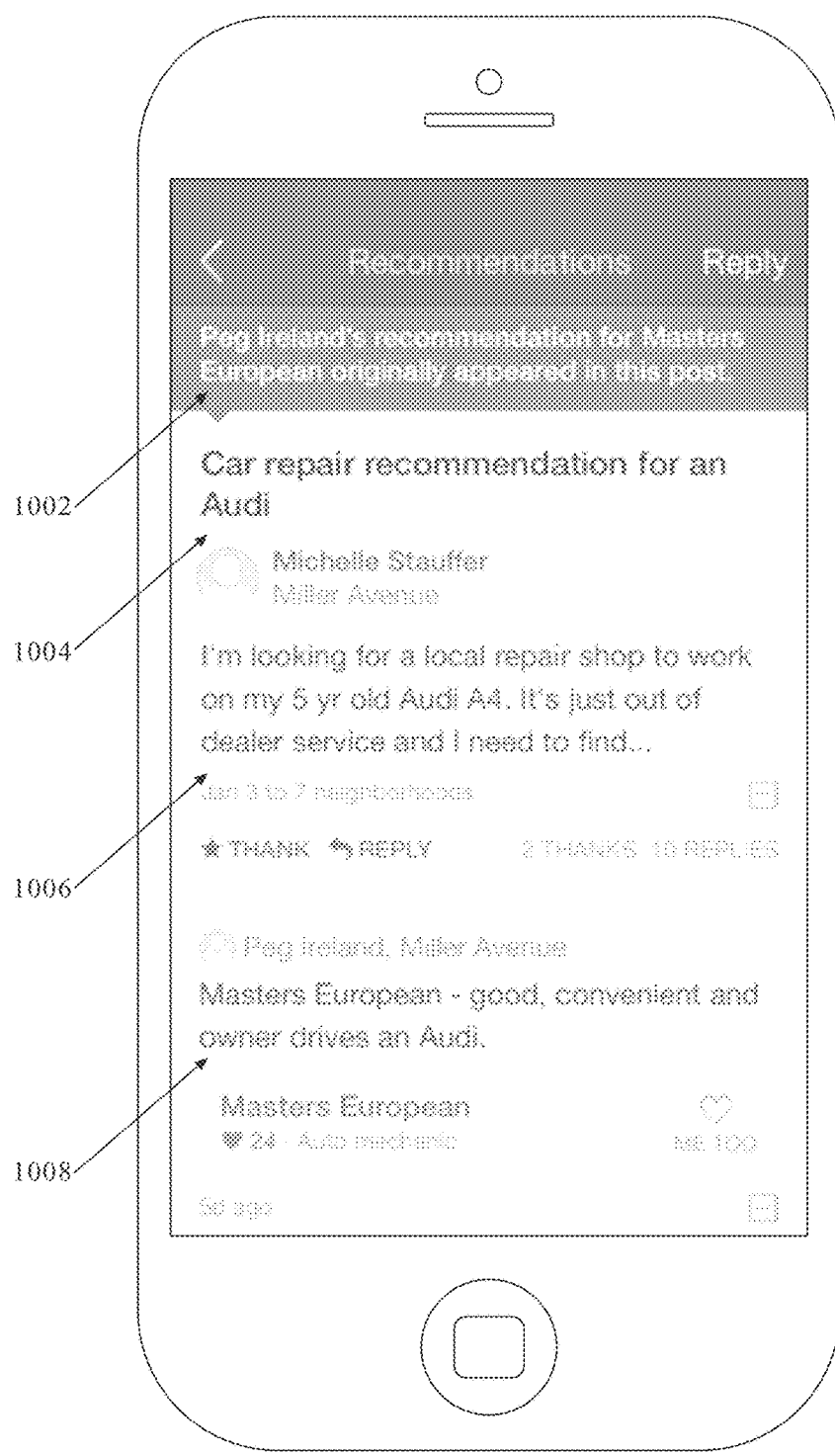
FIG. 10 is a computing device displaying a graphical user interface depicting an originating recommendation request for a recommendation for a particular entity.

FIG. 10 is a computing device displaying a graphical user interface depicting an originating recommendation request for a recommendation for a particular entity. The display of FIG. 10 includes origination details 1002, original post title 1004, original post 1006, and original reply 1008. Origination details 1002 describes the recommendation selected through the interface of FIG. 9 and the origination of the recommendation. For example, origination details 1002 in FIG. 10 identifies the name of the recommender, the name of the recommended entity, and an indication that the recommendation originated from the below post. Original post title 1004 comprises the original title of the post and original post 1006 comprises the original recommendation request for original reply 1008. Original reply 1008 comprises a reply to original post 1006, which identified the particular entity of FIG. 9. In the case of FIG. 10, the reply included a recommendation for the particular entity. In other scenarios, the reply may include a comment and an identification of the particular entity without including a recommendation for the entity. By providing the original recommendation request for each recommendation, social networking server computer 104 provides an interface that allows users to review a discussion that led to a specific recommendation. By reading through the discussion, the user can get a sense of the community's feelings about the particular entity and can view other responses to the recommendation request. Thus, if multiple other users recommended a different entity, the user would be able to view the recommendations for the different entity through the recommendation for the particular entity. In this manner, social networking server computer 104 provides additional information about the particular entity and other comparable entities of the same entity type through the entity interface.

Requesting Additional Information

Figure 11:
FIG. 11 is a computing device displaying a graphical user interface depicting a comments page for a particular entity that does not have current comments or recommendations.

FIG. 11 is a computing device displaying a graphical user interface depicting a comments page for a particular entity that does not have current comments or recommendations. The display of FIG. 11 includes ask neighbors option 1102, outside recommendations 1104, and add comment option 1106. While FIG. 11 depicts a display where no recommendations have been received from nearby neighbors, ask neighbors option 1102, outside recommendations 1104, and add comment option 1106 may also be included on the particular entity display of FIG. 8 and FIG. 9. In an embodiment, selection of ask neighbors option 1102 creates a post that is displayed through other social networking profiles associated with the same region as the selecting profile. The post generated from the selection of ask neighbors option 1102 may request information regarding the particular entity. Replies to the post may also be stored as comments about the particular entity. In an embodiment, the replies are stored as comments about the particular entity regardless of whether the particular entity was tagged in the reply. In alternative embodiments, the replies are only stored as comments about the particular entity if the replier indicates that the reply is a comment about the particular entity, such as by responding to a prompt asking if the user would like to tag the particular entity in the comment. Comments may also be associated with recommendations in the manners described herein. Outside recommendations 1104 depict one or more recommendation counters for the particular entity that are outside of the geographic region associated with the viewing social networking account. For example, FIG. 11 depicts recommendation counters for Strawberry Hill, Tamalpais Valley, Tamal Vista, and Tennessee Valley, and an aggregate recommendation counter comprising a summation of the other recommendation counters.

Figure 12:
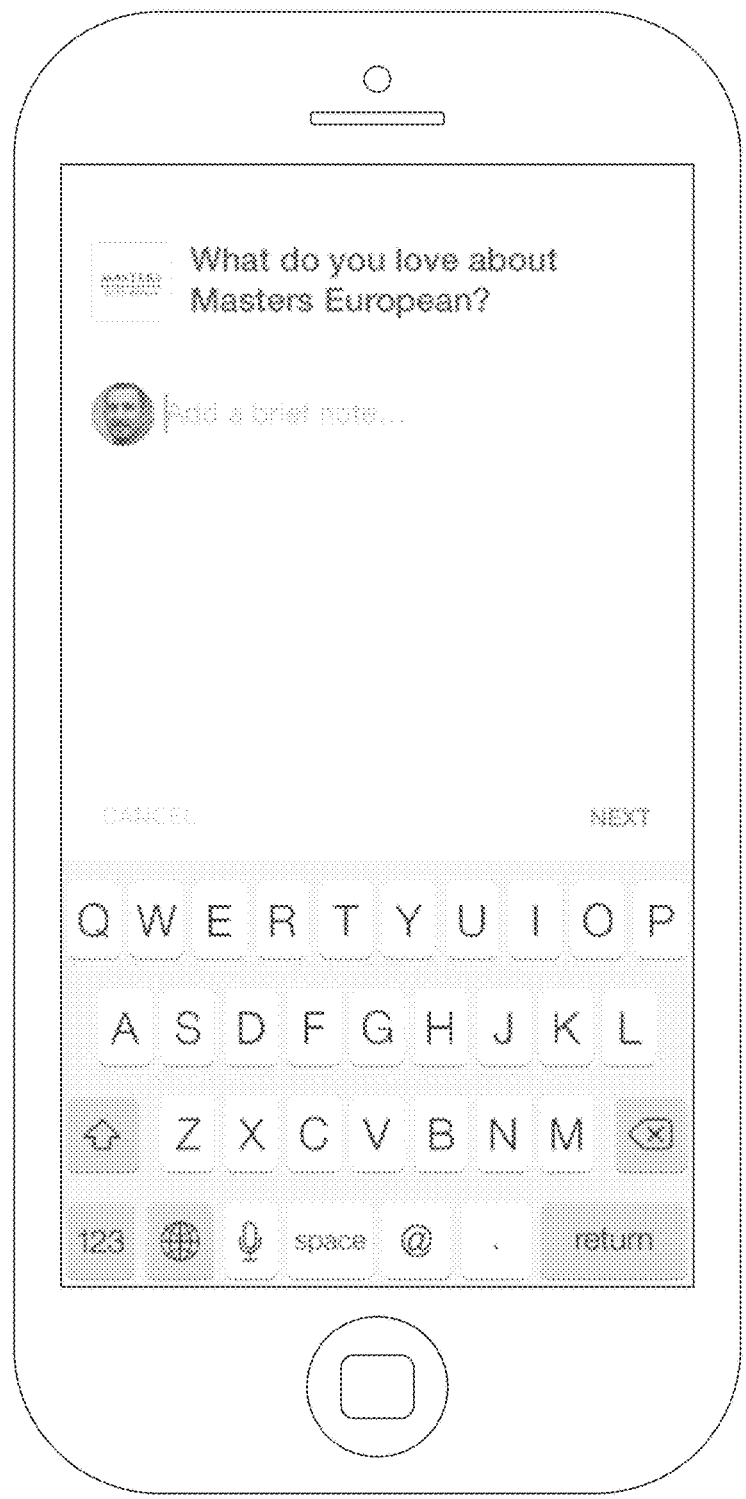
FIG. 12 is a computing device displaying a graphical user interface depicting a comment request for a recommendation of a particular entity.

Add comment option 1106 is a selectable option that provides a medium for a user of a social networking account to comment about the business. In an embodiment, the display of FIG. 11 and FIG. 8 provides a mechanism for providing a recommendation or providing a comment. Selection of the mechanism for providing the recommendation may cause display of a request to describe what the user recommends about the business. For example, FIG. 12 is a computing device displaying a graphical user interface depicting a comment request for a recommendation of a particular entity. The display of FIG. 12 includes a request for a comment describing what the recommender recommends about the particular entity.

Figure 13:
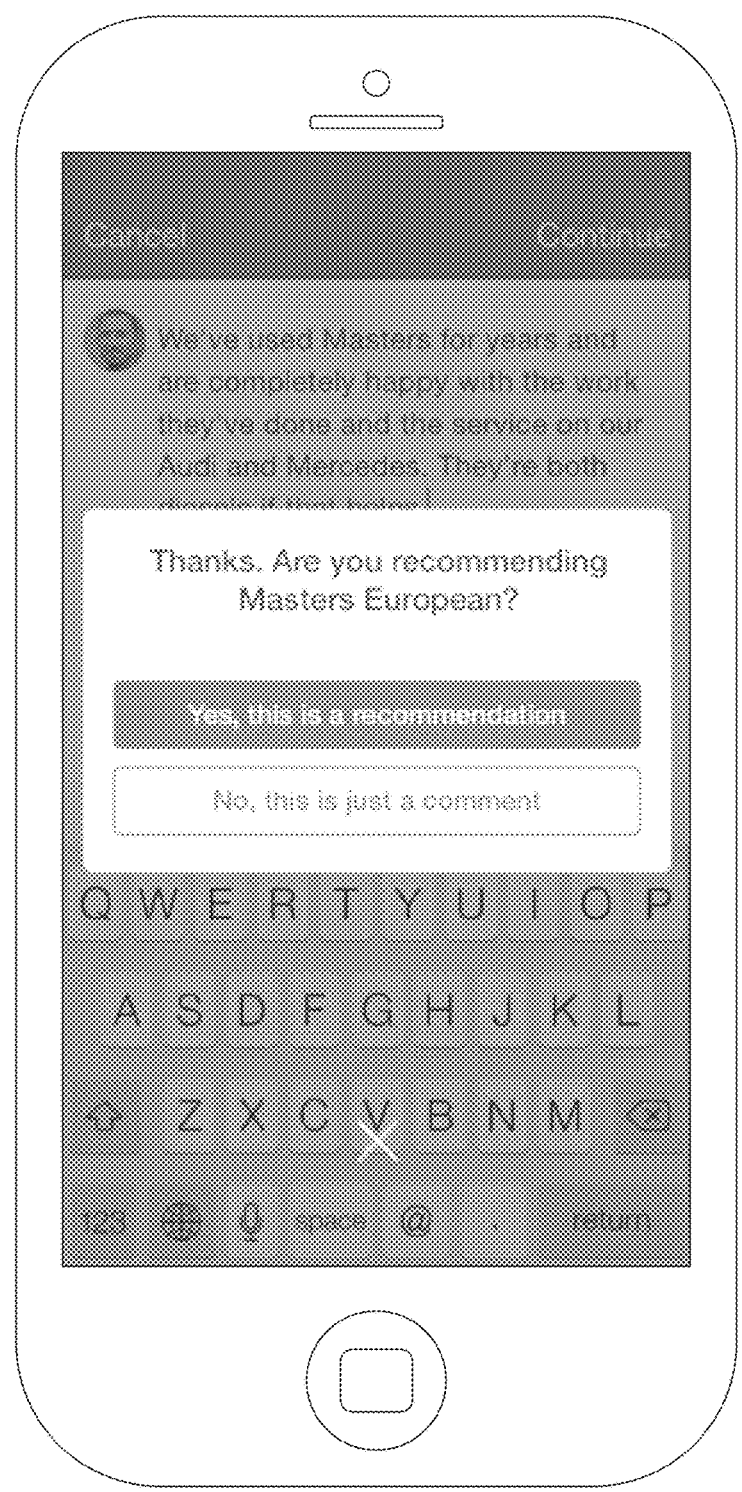
FIG. 13 is a computing device displaying a graphical user interface depicting a recommendation request on a comment for a particular entity.

Selection of the mechanism for providing the comment may cause display of a request to indicate whether the comment is a recommendation. For example, FIG. 13 is a computing device displaying a graphical user interface depicting a recommendation request on a comment for a particular entity. The display of FIG. 13 includes a request for an indication as to whether a comment is a recommendation. The request of FIG. 13 may be displayed in response to a comment created on the entity display, such as the display of FIG. 8, or in response to a comment created as a response to a recommendation request that tags an entity, such as in FIG. 4, FIG. 5, and FIG. 6.

In an embodiment, if a recommendation does not include a comment, the recommendation may be selectable to request additional information. For example, a recommendation may originate from a selection of a recommendation option on a particular entity page. If the recommender chooses to not leave a comment, the recommendation may appear without a comment. In an embodiment, the recommendation may be selectable to others viewing the recommendation page. A selection of the recommendation may cause device 300 to display an option to request additional information. A selection of the option to request additional information may cause a message to be sent to the original recommender requesting a comment as to why the particular business was recommended. In some embodiments, the option to request additional information is limited by the geographic region of the requestor and the original recommender. For example, a limitation may specify that only social networking accounts in the same region or directly surrounding regions may request additional information.

In an embodiment, social networking server computer 104 requests additional information from social networking accounts in response to determining that a business type has received too few recommendations. For example, social networking server computer 104 may receive a request for car mechanics in a specific region. Social networking server computer 104 may determine that it has not received enough recommendations for car mechanics in the specific region. In an embodiment, the determination is based on a threshold value. For example, social networking server computer 104 may determine that the threshold value is ten recommendations. If less than ten recommendations for an auto mechanic have been received for the specific region, social networking server computer 104 may send a request for recommendations for an auto mechanic to social networking accounts in the specific region.

In some embodiments, social networking server computer 104 identifies a set of the social networking account from which to request recommendations for entities of the specific entity type. Social networking server computer may use digitally stored logic to identify the set of social networking accounts. For example, social networking server computer 104 may use information from the stored social networking accounts, past actions of the stored social networking accounts, such as searches, posts, and past recommendations, and demographic data associated with the social networking accounts to identify the set of social networking accounts. For example, if a particular social networking account is generally active in creating restaurant recommendations but has not created a recommendation for a Thai restaurant in the area, social networking server computer 104 may send a message to the particular social networking account requesting a recommendation for a Thai restaurant.

In an embodiment, each time a social networking account creates a search for entities of a particular entity type, social networking server computer 104 stores information identifying the search for the entity type. When social networking server computer 104 determines that a business type has received too few recommendations, social networking server computer 104 may access the stored prior search data and identify social networking accounts that had previously searched for entities of the particular entity type. Social networking server computer 104 may send a message to each identified account requesting information as to whether the user of the social networking account utilized an entity of the particular entity type recently and whether the user would recommend the entity.

In an embodiment, social networking server computer 104 refrains from sending a request to a particular social networking account if the particular social networking account has already recommended an entity of the particular entity type. Additionally, social networking server computer 104 may refrain from sending a request to a particular social networking account if the particular social networking account left a comment about an entity of the particular entity type more recently than the search by the particular social networking account for an entity of the particular entity type. For example, if on day 1 a social networking account searches for automobile mechanics and on day 3 the social networking account comments on a post with a tag for an automobile mechanic without a recommendation, social networking server computer 104 may refrain from sending a request to the particular social networking account for a recommendation for an automobile mechanic. In some embodiments, social networking server computer 104 may send a message to the particular social networking account asking if the user of the particular social networking account would recommend the tagged entity. If social networking server computer 104 receives an indication from the social networking account that the user would not like to recommend the tagged entity, social networking server computer 104 may send a second message requesting identification of an entity that the user of the social networking account would like to recommend.

Additional Embodiments

In an embodiment, social networking server computer 104 creates a Favorites list which indicates entities that that are considered "Favorites" based on recommendations. In an embodiment, each entity that has received the most recommendations for the particular entity type is considered to be one of the "Favorites." In some embodiments, social networking server computer 104 determines which entities are considered Favorites by using a threshold value for recommendations. For example, a threshold value of twenty recommendations may be used to determine if a particular entity is considered one of the Favorites. Thus, if a restaurant received more than twenty recommendations, it would be considered a favorite.

In an embodiment, the Favorites determination is region specific. For example, a Favorites threshold for Apple Mountain may not be satisfied by recommendations from Cherry Hill. By limiting the Favorites to entities that have been recommended within the specific neighborhood, social networking server computer 104 maintains the trust of the neighborhood embodied in the recommendations such that a user who views the Favorites can be ensured that the displayed entities were well received by the neighborhood community Additionally, the threshold value may be determined based on the size of the community. For example, a community with five hundred people may contain a different threshold value than a community of sixty people.

Figure 14:
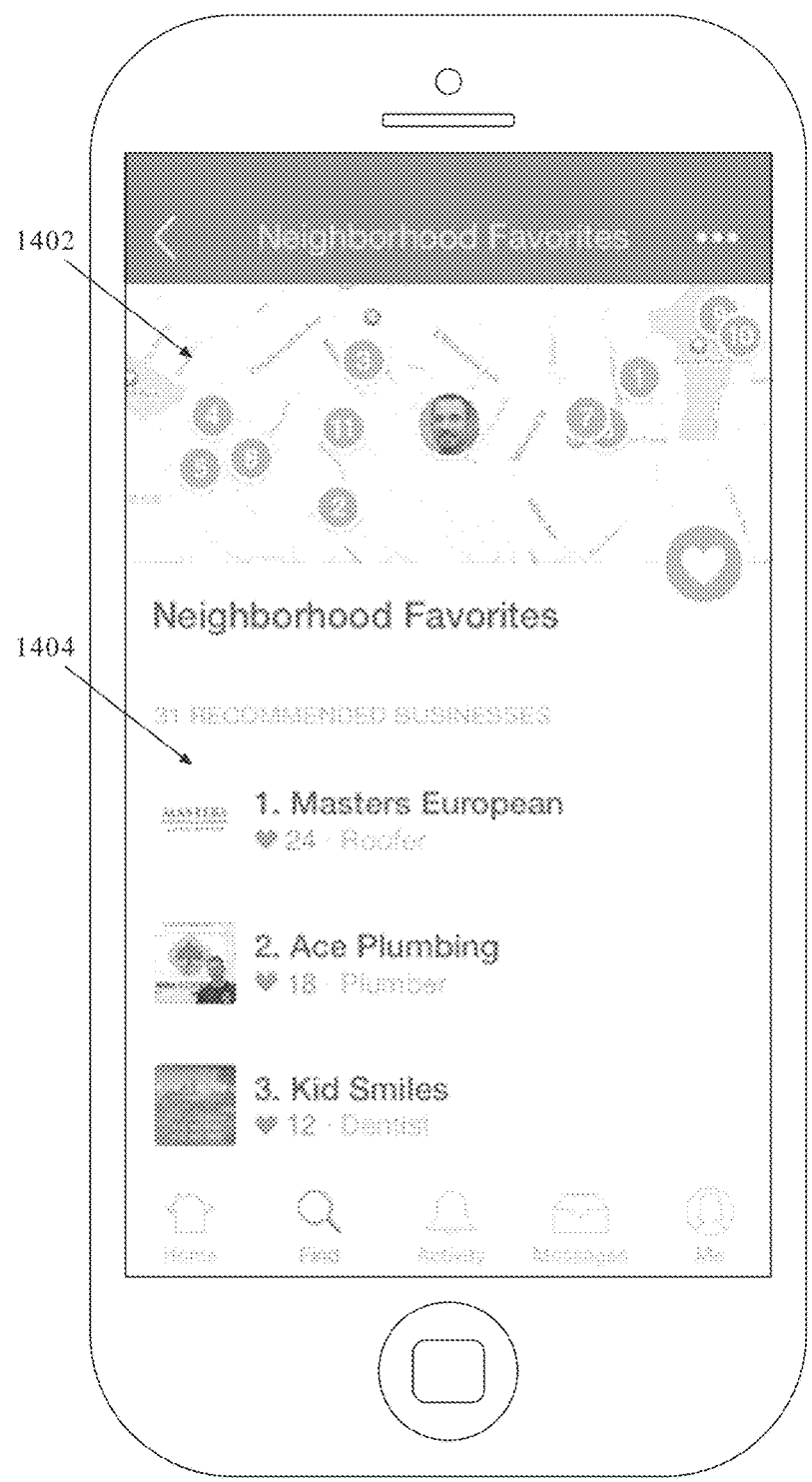
FIG. 14 is a computing device displaying a graphical user interface depicting a neighborhood Favorites display.

In an embodiment, a Favorites display may be displayed on a computing device associated with a social networking account. FIG. 14 is a computing device displaying a graphical user interface depicting a neighborhood Favorites display. FIG. 14 contains Favorites map 1402 and Favorites entities 1404. Favorites map 1402 shows the location associated with the social networking account and the locations of Favorites entities 1404. Favorites entities 1404 are entities that have been determined by social networking server computer 104 to contain enough recommendations to be considered a favorite. Favorites entities 1404 may be ordered by number of recommendations or distance from the location associated with the social networking account.

The methods described herein may be initialized with a social networking platform in a manner that preserves prior recommendations from posts. In an embodiment, social networking server computer 104 identifies past posts which may involve a recommendation or comment for an entity. Social networking server computer 104 may identify the posts by searching for names of known entities in past conversations, searching for names of newly tagged entities in past conversations, or providing anonymous past conversation data to a third party source to identify entities discussed in the past conversations. As an example of the first method of identification, social networking server computer 104 may initialize a web search for businesses within a geographic region and use the results to search through prior posts for matching business names. As an example of the second method, when social networking server computer 104 receives a tag of a new business, social networking server computer 104 may search through prior posts for names that match the tag of the new business. As an example of the third method of identification, social networking server computer 104 may create anonymous versions of prior posts, e.g. by removing the names of the poster and repliers, and release the data to a crowd sourcing third party which allows multiple users to read through the posts and tag entities based on the posts. If more than one user has tagged the same entity for the same post, social networking server computer 104 may identify the post as including the entity.

Once social networking server computer 104 identifies the past posts that may include a recommendation or comment for an entity, social networking server computer 104 may aggregate the possible posts into a plurality of lists. A first list of the plurality of lists may include the comments or posts from a first social networking account. Social networking server computer 104 may send the first list to the first social networking account with a request for the user of the first social networking account to identify whether the comments on the list relate to the identified entities and whether any of the comments are recommendations for the identified entities. In response to receiving an indication that one of the items on the first list is a comment for a particular entity, social networking server computer 104 may associate the comment with the particular entity by placing the comment on the particular entity's display page. In response to receiving an indication that one of the items on the first list is a recommendation for the particular entity, social networking server computer 104 may determine that the social networking account has not already recommended the particular entity, increment the recommendation counter, and associate the comment with the particular entity by placing the comment on the particular entity's display page.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
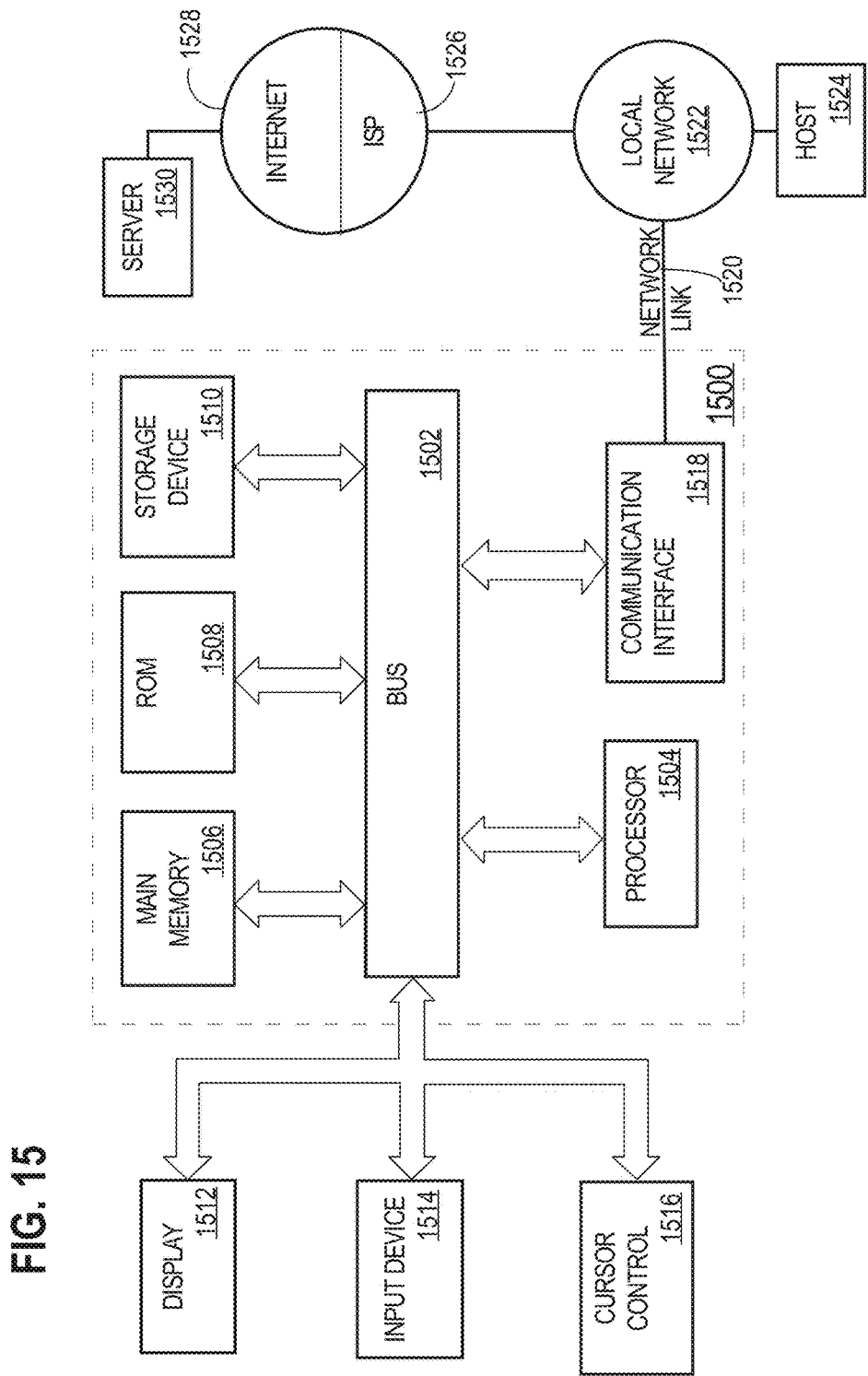
FIG. 15 is a block diagram that illustrates a computer system 1500 upon which an embodiment may be implemented.

For example, FIG. 15 is a block diagram that illustrates a computer system 1500 upon which an embodiment may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk, optical disk, or solid-state drive is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1510. Volatile media includes dynamic memory, such as main memory 1506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

Benefits of Certain Embodiments

Using the techniques described herein, a social networking server computer may generate recommendation data that would otherwise be unavailable using conventional recommendation methods. For example, the methods described herein allow a person to make a recommendation as part of a social networking dialogue, thereby increasing the number of recommendations for particular products and services. Additionally, by allowing a viewer of a particular entity to view the social networking dialogue that led to the request, the social networking server computer is able to provide context to recommendations that is unavailable in conventional methods of generating review websites.

Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
at a social network server computer, storing account information for a plurality of social networking accounts comprising geographic data, user identification data, and prior recommendation data;
using digitally programmed logic of the social network server computer, causing displaying, through a graphical user interface on a first computing device associated with a first social networking account, a recommendation request option, wherein first account information for the first social networking account comprises geographic data for a particular geographic region;
using digitally programmed logic of the social network server computer, receiving, through the graphical user interface on the first computing device, a selection of the recommendation request option, and, in response, generating a recommendation request;
using digitally programmed logic of the social network server computer, determining that second account information for a second social networking account comprises geographic data for the same particular geographic region;
using digitally programmed logic of the social network server computer, only in response to determining that the second account information comprises geographic data for the particular geographic region, causing displaying, through a graphical user interface on a second computing device associated with the second social networking account, the recommendation request;
using digitally programmed logic of the social network server computer, receiving, through the graphical user interface on the second computing device, first input indicating a recommendation for a particular entity;
using digitally programmed logic of the social network server computer, in response to receiving first input indicating the recommendation for the particular entity, causing displaying, through the graphical user interface on the first computing device, the first input indicating the recommendation for the particular entity;
using digitally programmed logic of the social network server computer, determining that the account information for the second social networking account comprises prior recommendation data that does not include a recommendation for the particular entity, and in response thereto, incrementing a particular recommendation counter for the particular entity.

2. The method of claim 1, further comprising:
receiving, through a graphical user interface on a third computing device associated with a third social networking account, a search request for recommended entities;
using digitally programmed logic of the social network server computer, causing displaying, through the graphical user interface on the third computing device, at least the particular entity and the particular recommendation counter for the particular entity.

3. The method of claim 2, further comprising, using digitally programmed logic of the social network server computer, causing displaying, through the graphical user interface on the third computing device, with the particular entity and the particular recommendation counter for the particular entity, the first input indicating the recommendation for the particular entity received through the graphical user interface on the second computing device and an identification of the second social networking account.

4. The method of claim 3, further comprising:
receiving, through the graphical user interface on the third computing device, a selection of the first input indicating the recommendation for the particular entity received through the graphical user interface on the second computing device;
using digitally programmed logic of the social network server computer, in response to receiving, through the graphical user interface on the third computing device, the selection of the first input indicating the recommendation for the particular entity received through the graphical user interface on the second computing device, causing displaying, through the graphical user interface on the third computing device, the recommendation request with the first input indicating the recommendation for the particular entity.

5. The method of claim 4 wherein displaying the recommendation request with the first input indicating the recommendation further comprises displaying one or more other responses to the recommendation request by one or more other computing devices associated with one or more other social networking accounts.

6. The method of claim 3, wherein the first input indicating the recommendation for the particular entity received through the graphical user interface on the second computing device does not include a comment, the method further comprising:
using digitally programmed logic of the social network server computer, causing displaying, through the graphical user interface on the third computing device, with the first input indicating the recommendation for the particular entity, an option to request additional information;
receiving, through the graphical user interface on the third computing device, a selection of the option to request additional information;
using digitally programmed logic of the social network server computer, in response to receiving the selection of the option to request additional information, sending to the second computing device a request to add a comment to the first input indicating the recommendation for the particular entity;
receiving, through a graphical user interface on the second computing device, comment input for the particular entity;
using digitally programmed logic of the social network server computer, causing displaying, through the graphical user interface on the third computing device, the first input indicating the recommendation for the particular entity and the comment input for the particular entity.

7. The method of claim 1, further comprising:
using digitally programmed logic of the social network server computer, identifying a plurality of entities of a particular entity type, including the particular entity;
using digitally programmed logic of the social network server computer, determining that the particular recommendation counter for the particular entity is higher than each other recommendation counter for other entities of the particular entity type;
using digitally programmed logic of the social network server computer, storing data identifying the particular entity as a favorite entity of the particular entity type;
using digitally programmed logic of the social network server computer, causing displaying, through a graphical user interface on a third computing device associated with a third social networking account, a favorites listing comprising a plurality of favorite entities of a plurality of entity types.

8. The method of claim 1, further comprising:
receiving, through a graphical user interface on a third computing device associated with a third social networking account, second input indicating a recommendation of the particular entity;
using digitally programmed logic of the social network server computer, determining that third account information for the third social networking account does not comprise geographic data for the particular geographic region;
using digitally programmed logic of the social network server computer, in response to determining that the third account information for the third social networking account does not comprise geographic data for the particular geographic region, incrementing a separate recommendation counter for the particular entity, and refraining from incrementing the particular recommendation counter for the particular entity.

9. The method of claim 1, wherein the first input indicating a recommendation of the particular entity includes a first comment, the method further comprising:
receiving, through a graphical user interface on the second computing device, second input indicating a recommendation of the particular entity, the second input including a second comment;
in response to receiving the second input indicating a recommendation of the particular entity, without incrementing the particular recommendation counter for the particular entity, storing the second comment in association with the particular entity;
receiving, through a graphical user interface on a third computing device associated with a third social networking account, a search request for recommended entities;
using digitally programmed logic of the social network server computer, causing displaying, through the graphical user interface on the third computing device, at least the particular entity, the particular recommendation counter for the particular entity, and the second comment.

10. The method of claim 1, further comprising:
receiving, through a graphical user interface on a third computing device associated with a third social networking account, a search request for recommended entities of a particular type;

determining that the social networking server computer has obtained an inadequate number of recommendations for entities of the particular entity type;

identifying a preferred social networking account associated with the particular geographic region based on one or more of: a recommendation history of the preferred social networking account, a profile associated with the preferred social networking account, or a search history of the preferred social networking account;

in response to identifying the preferred social networking account, sending, to a second particular computing device associated with the preferred social networking account, a request for a recommendation for an entity of the particular entity type.

11. The method of claim 10 further comprising sending, to the second particular computing device, the request for a recommendation for an entity of the particular entity type only in response to determining that a recommendation for a recommended entity of the particular entity type has not been obtained from the preferred social networking account.

12. One or more non-transitory computer readable media storing instructions which, when executed by one or more processors, cause performance of:

at a social network server computer, storing account information for a plurality of social networking accounts comprising geographic data, user identification data, and prior recommendation data;

causing displaying, through a graphical user interface on a first computing device associated with a first social networking account, a recommendation request option;

wherein first account information for the first social networking account comprises geographic data for a particular geographic region;

receiving, through the graphical user interface on the first computing device, a selection of the recommendation request option, and, in response, generating a recommendation request;

determining that second account information for a second social networking account comprises geographic data for the same particular geographic region;

only in response to determining that the second account information comprises geographic data for the particular geographic region, causing displaying, through a graphical user interface on a second computing device associated with the second social networking account, the recommendation request;

receiving, through the graphical user interface on the second computing device, first input indicating a recommendation for a particular entity;

in response to receiving input indicating the recommendation for the particular entity, causing displaying, through the graphical user interface on the first computing device, the recommendation for the particular entity;

determining that the account information for the second social networking account comprises prior recommendation data that does not include a recommendation for the particular entity, and in response thereto, incrementing a particular recommendation counter for the particular entity.

13. The one or more non-transitory computer readable media of claim 12, wherein the instructions, when executed by the one or more processors, further cause performance of:

receiving, through a graphical user interface on a third computing device associated with a third social networking account, a search request for recommended entities;

causing displaying, through the graphical user interface on the third computing device, at least the particular entity and the particular recommendation counter for the particular entity.

14. The one or more non-transitory computer readable media of claim 13, wherein the instructions, when executed by the one or more processors, further cause performance of:

using digitally programmed logic of the social network server computer, causing displaying, through the graphical user interface on the third computing device, with the particular entity and the particular recommendation counter for the particular entity, the first input indicating the recommendation for the particular entity received through the graphical user interface on the second computing device and an identification of the second social networking account.

15. The one or more non-transitory computer readable media of claim 14, wherein the instructions, when executed by the one or more processors, further cause performance of:

receiving, through the graphical user interface on the third computing device, a selection of the first input indicating the recommendation for the particular entity received through the graphical user interface on the second computing device;

using digitally programmed logic of the social network server computer, in response to receiving, through the graphical user interface on the third computing device, the selection of the first input indicating the recommendation for the particular entity received through the graphical user interface on the second computing device, causing displaying, through the graphical user interface on the third computing device, the recommendation request with the first input indicating the recommendation for the particular entity.

16. The one or more non-transitory computer readable media of claim 15 wherein displaying the recommendation request with the first input indicating the recommendation further comprises displaying one or more other responses to the recommendation request by one or more other computing devices associated with one or more other social networking accounts.

17. The one or more non-transitory computer readable media of claim 14, wherein the first input indicating the recommendation for the particular entity received through the graphical user interface on the second computing device does not include a comment, wherein the instructions, when executed by the one or more processors, further cause performance of:

using digitally programmed logic of the social network server computer, causing displaying, through the graphical user interface on the third computing device, with the first input indicating the recommendation for the particular entity, an option to request additional information;

receiving, through the graphical user interface on the third computing device, a selection of the option to request additional information;

using digitally programmed logic of the social network server computer, in response to receiving the selection of the option to request additional information, sending to the second computing device a request to add a comment to the first input indicating the recommendation for the particular entity;

receiving, through a graphical user interface on the second computing device, comment input for the particular entity;

using digitally programmed logic of the social network server computer, causing displaying, through the graphical user interface on the third computing device, the first input indicating the recommendation for the particular entity and the comment input for the particular entity.

18. The one or more non-transitory computer readable media of claim 12, wherein the instructions, when executed by the one or more processors, further cause performance of:

using digitally programmed logic of the social network server computer, identifying a plurality of entities of a particular entity type, including the particular entity;

using digitally programmed logic of the social network server computer, determining that the particular recommendation counter for the particular entity is higher than each other recommendation counter for other entities of the particular entity type;

using digitally programmed logic of the social network server computer, storing data identifying the particular entity as a favorite entity of the particular entity type;

using digitally programmed logic of the social network server computer, causing displaying, through a graphical user interface on a third computing device associated with a third social networking account, a favorites listing comprising a plurality of favorite entities of a plurality of entity types.

19. The one or more non-transitory computer readable media of claim 12, wherein the instructions, when executed by the one or more processors, further cause performance of:

receiving, through a graphical user interface on a third computing device associated with a third social networking account, second input indicating a recommendation of the particular entity;

using digitally programmed logic of the social network server computer, determining that third account information for the third social networking account does not comprise geographic data for the particular geographic region;

using digitally programmed logic of the social network server computer, in response to determining that the third account information for the third social networking account does not comprise geographic data for the particular geographic region, incrementing a separate recommendation counter for the particular entity, and refraining from incrementing the particular recommendation counter for the particular entity.

20. The one or more non-transitory computer readable media of claim 12, wherein the first input indicating a recommendation of the particular entity includes a first comment, wherein the instructions, when executed by the one or more processors, further cause performance of:

receiving, through a graphical user interface on the second computing device, second input indicating a recommendation of the particular entity, the second input including a second comment;

in response to receiving the second input indicating a recommendation of the particular entity, without incrementing the particular recommendation counter for the particular entity, storing the second comment in association with the particular entity;

receiving, through a graphical user interface on a third computing device associated with a third social networking account, a search request for recommended entities;

using digitally programmed logic of the social network server computer, causing displaying, through the graphical user interface on the third computing device, at least the particular entity, the particular recommendation counter for the particular entity, and the second comment.

21. The one or more non-transitory computer readable media of claim 12, wherein the instructions, when executed by the one or more processors, further cause performance of:

receiving, through a graphical user interface on a third computing device associated with a third social networking account, a search request for recommended entities of a particular type;

determining that the social networking server computer has obtained an inadequate number of recommendations for entities of the particular entity type;

identifying a preferred social networking account associated with the particular geographic region based on one or more of: a recommendation history of the preferred social networking account, a profile associated with the preferred social networking account, or a search history of the preferred social networking account;

in response to identifying the preferred social networking account, sending, to a second particular computing device associated with the preferred social networking account, a request for a recommendation for an entity of the particular entity type.

22. The one or more non-transitory computer readable media of claim 21 wherein the instructions, when executed by the one or more processors, further cause performance of:

sending, to the second particular computing device, the request for a recommendation for an entity of the second particular entity type only in response to determining that a recommendation for a recommended entity of the particular entity type has not been obtained from the preferred social networking account.

* * * * *

(12) EX PARTE REEXAMINATION CERTIFICATE (11918th)

United States Patent
Tolia et al.

(10) Number: US 10,157,412 C1
(45) Certificate Issued: Sep. 22, 2021

(54) GENERATING AND DISPLAYING RECOMMENDATION COUNTERS BASED ON RECOMMENDATION DIALOGUE CAPTURED THROUGH A SOCIAL NETWORK AND CONSTRAINED BY GEOGRAPHIC REGIONS OF THE RECOMMENDERS

(71) Applicant: Nextdoor.com, Inc., San Francisco, CA (US)

(72) Inventors: Nirav N. Tolia, San Francisco, CA (US); Aaron Webber, San Francisco, CA (US); Rishi Mukhopadhyay, San Francisco, CA (US); Sean Bromage, San Francisco, CA (US); Kevin Liu, San Francisco, CA (US); Paul Howe, Mill Valley, CA (US); Ryan Sims, San Francisco, CA (US); Daniel J. Clancy, Los Altos, CA (US); Morgan Hallmon, Oakland, CA (US); Daniel Masquelier, San Francisco, CA (US)

(73) Assignee: NEXTDOOR, INC., San Francisco, CA (US)

Reexamination Request:
No. 90/014,697, Mar. 31, 2021

Reexamination Certificate for:
Patent No.: 10,157,412
Issued: Dec. 18, 2018
Appl. No.: 14/930,469
Filed: Nov. 2, 2015

Related U.S. Application Data

(60) Provisional application No. 62/168,677, filed on May 29, 2015.

(51) Int. Cl.
*G06Q 30/06* (2012.01)
*G06Q 30/02* (2012.01)
*G06F 3/0484* (2013.01)
*G06Q 50/00* (2012.01)
*H04L 12/58* (2006.01)
*H04L 29/08* (2006.01)

(52) U.S. Cl.
CPC ..... *G06Q 30/0631* (2013.01); *G06F 3/04842* (2013.01); *G06Q 30/0201* (2013.01); *G06Q 30/0282* (2013.01); *G06Q 50/01* (2013.01); *H04L 51/32* (2013.01); *H04L 67/18* (2013.01)

(58) Field of Classification Search
None
See application file for complete search history.

(56) References Cited

To view the complete listing of prior art documents cited during the proceeding for Reexamination Control Number 90/014,697, please refer to the USPTO's public Patent Application Information Retrieval (PAIR) system under the Display References tab.

*Primary Examiner* — Dennis G Bonshock

(57) ABSTRACT

A system and method for generating a recommendation counter for a business entity based on social networking interactions is provided. In an embodiment, a social networking server provides an interface for users of social networking accounts to request recommendations for business entities and to reply to the requests with recommendations. When the social networking server computer receives a recommendation for a particular business entity, the social networking server computer determines whether the recommending social networking account has recommended the particular business entity in the past. In response to determining that the social networking account has not recommended the particular business entity in the past, the social networking server computer increments a recommendation counter for the particular business entity.

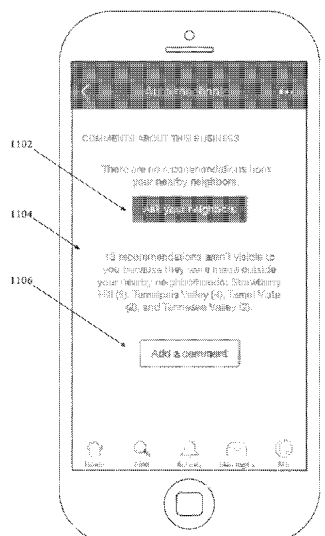

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-22 is confirmed.

\* \* \* \* \*